A. M. PRICE.
WRAPPING MACHINE.
APPLICATION FILED APR. 8, 1913.

1,185,822.

Patented June 6, 1916.
27 SHEETS—SHEET 2.

Witnesses:
Harry S. Gaither

Inventor:
Albert M. Price
by Dyrenforth, Lee, Chritton & Wiles,
Att'ys

A. M. PRICE.
WRAPPING MACHINE.
APPLICATION FILED APR. 8, 1913.

1,185,822.

Patented June 6, 1916.
27 SHEETS—SHEET 3.

Inventor
Albert M. Price

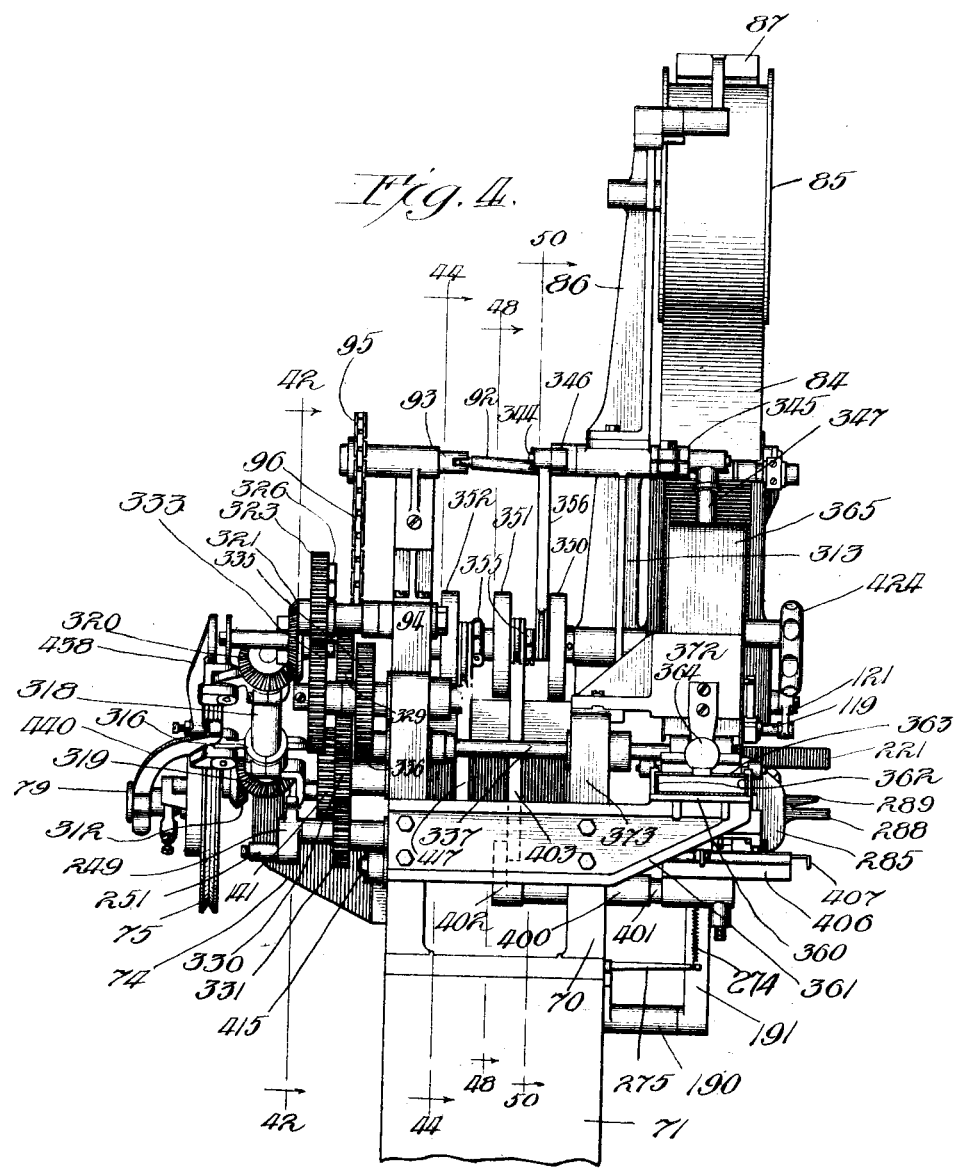

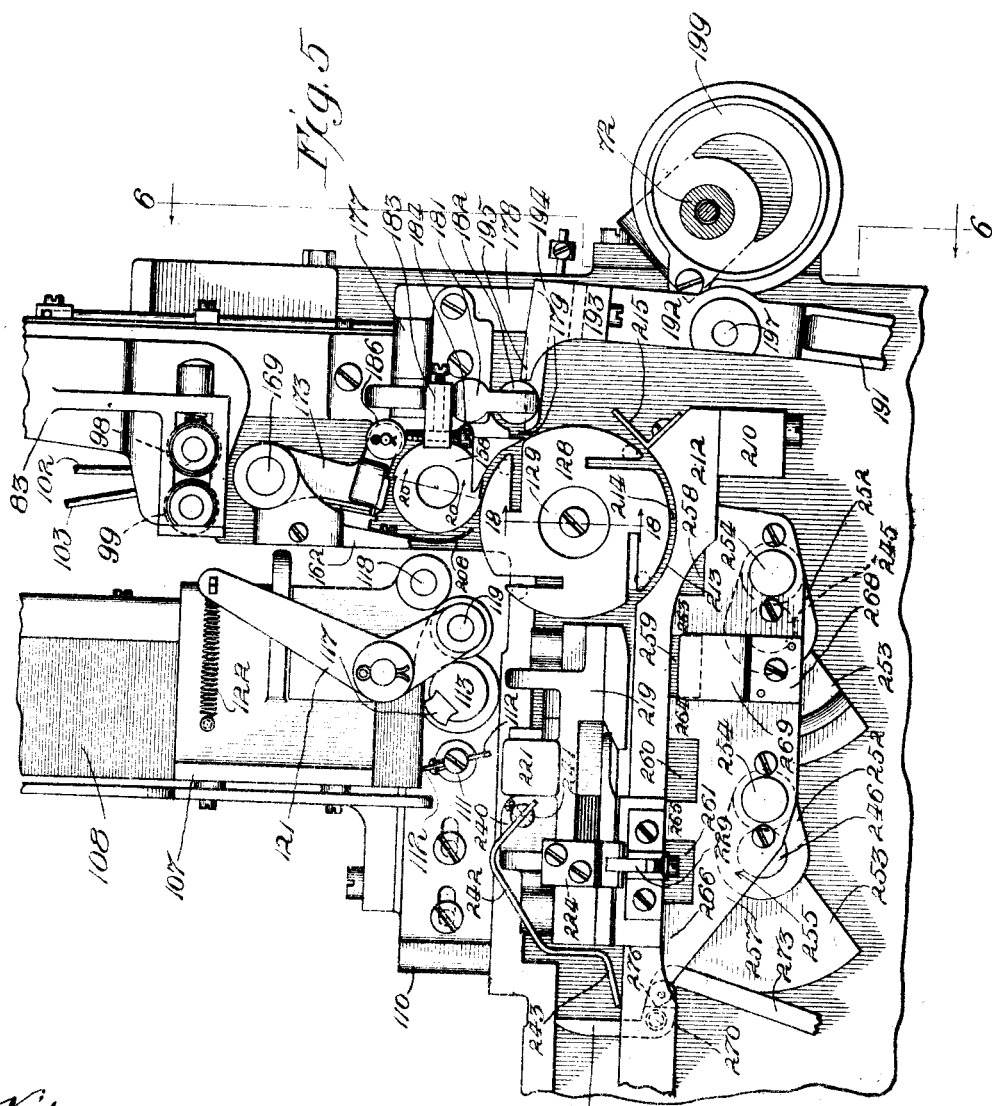

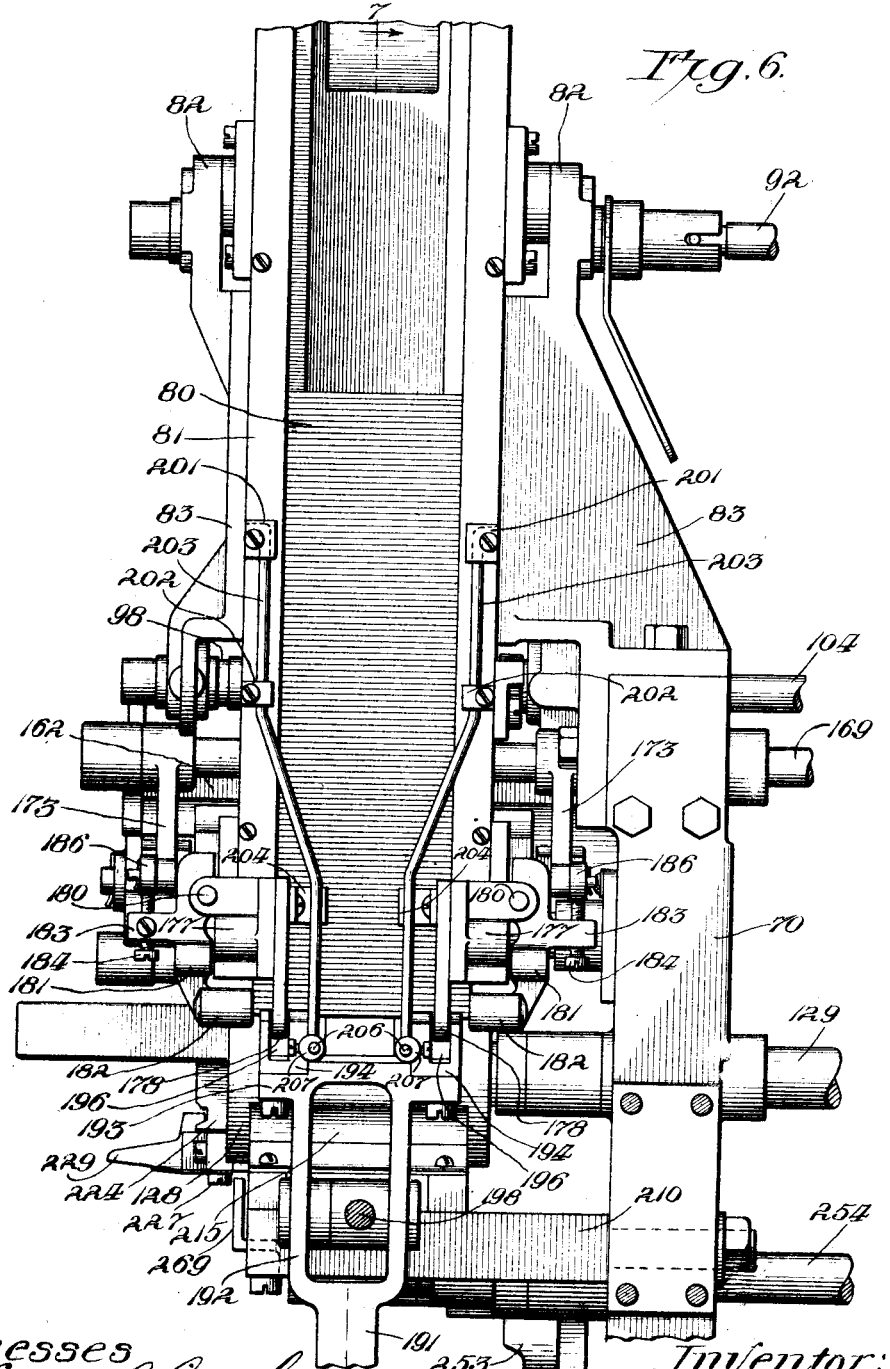

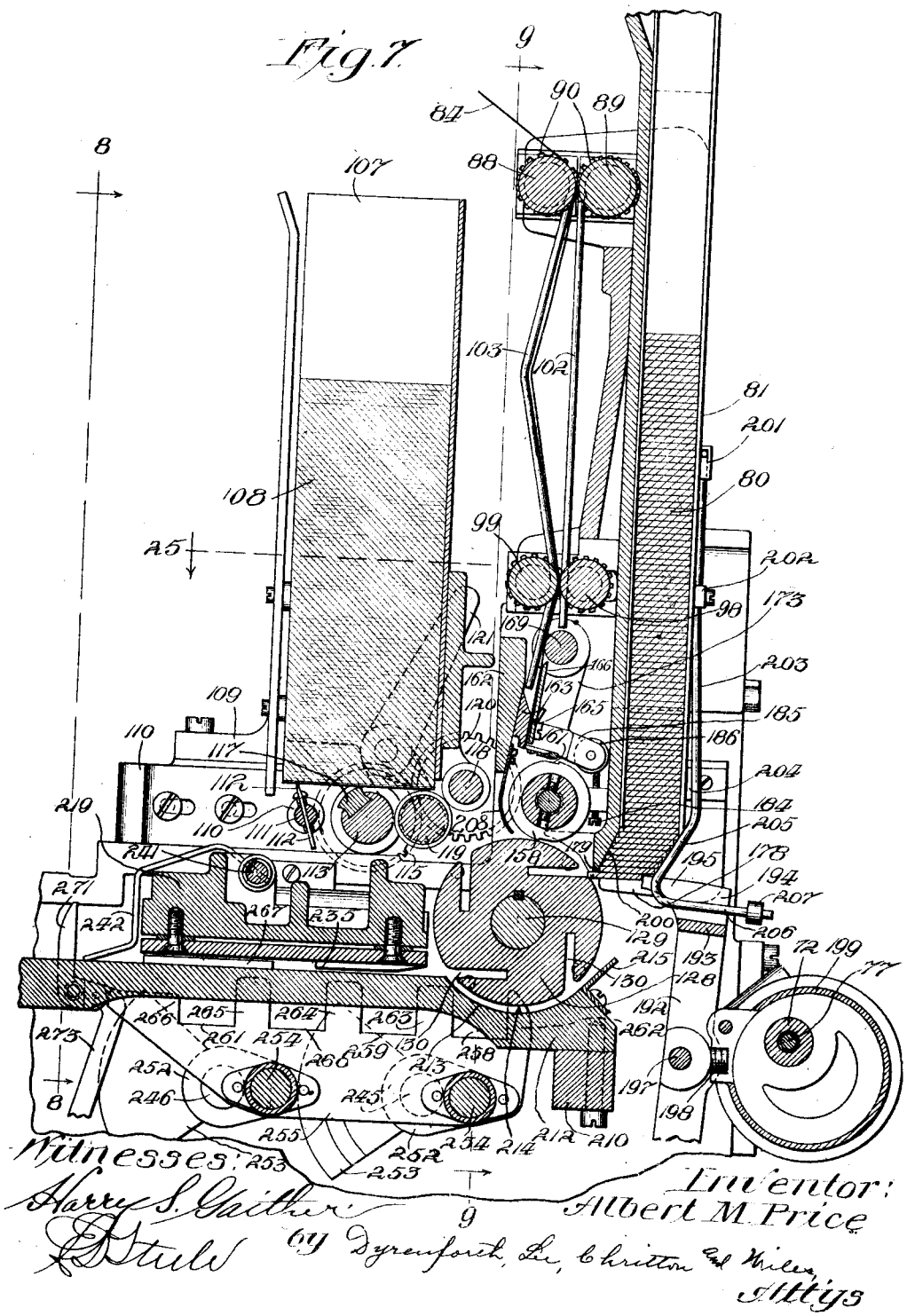

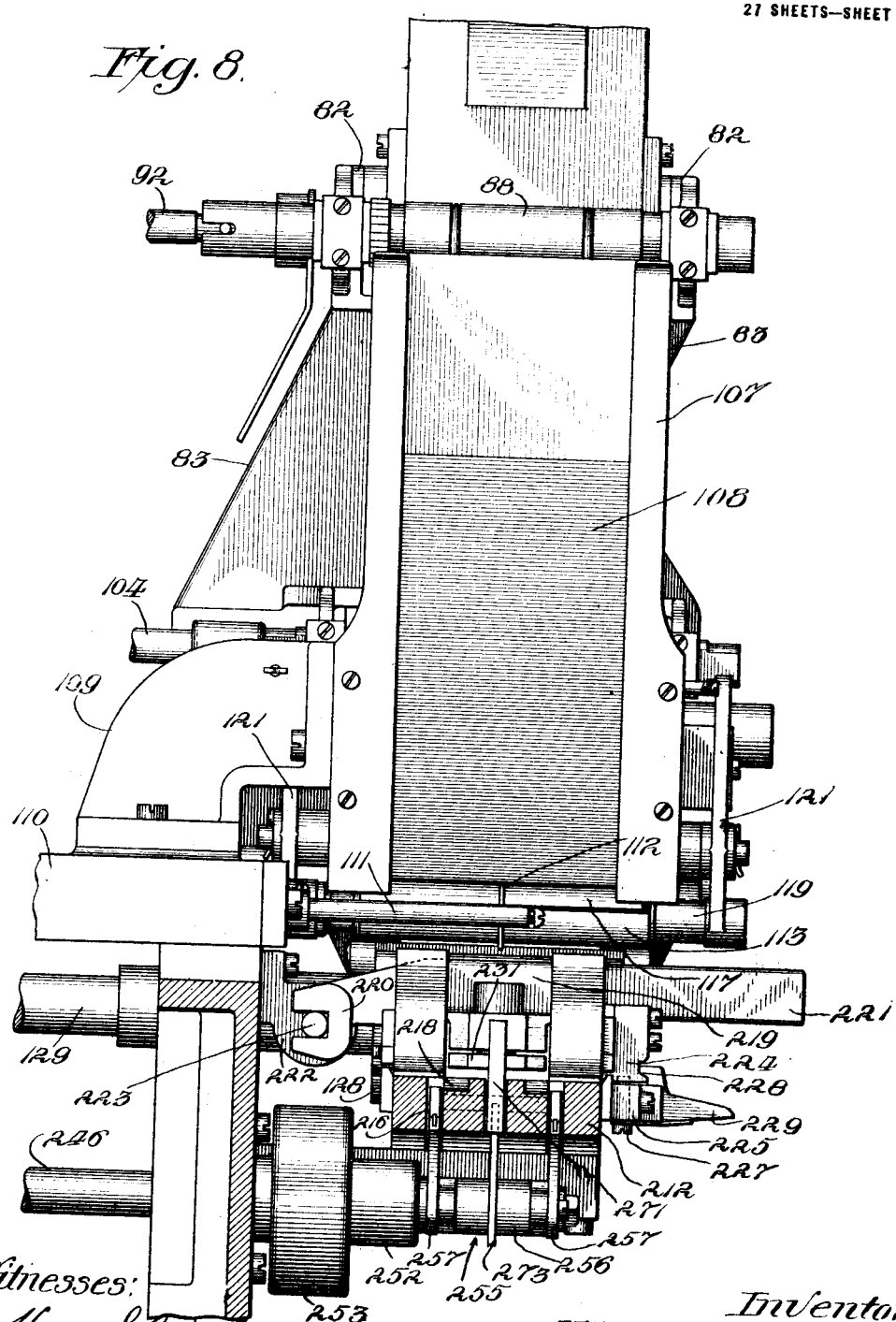

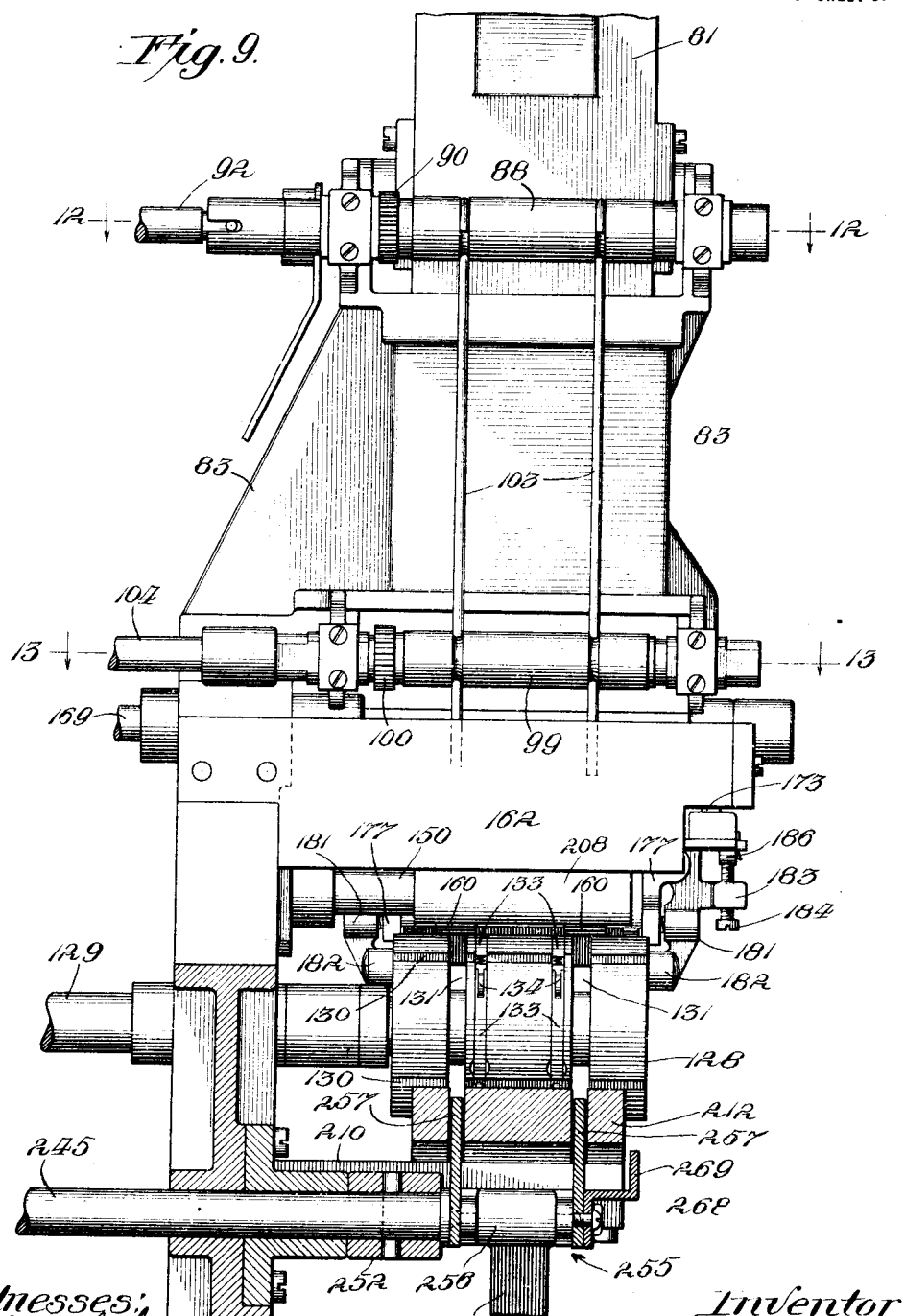

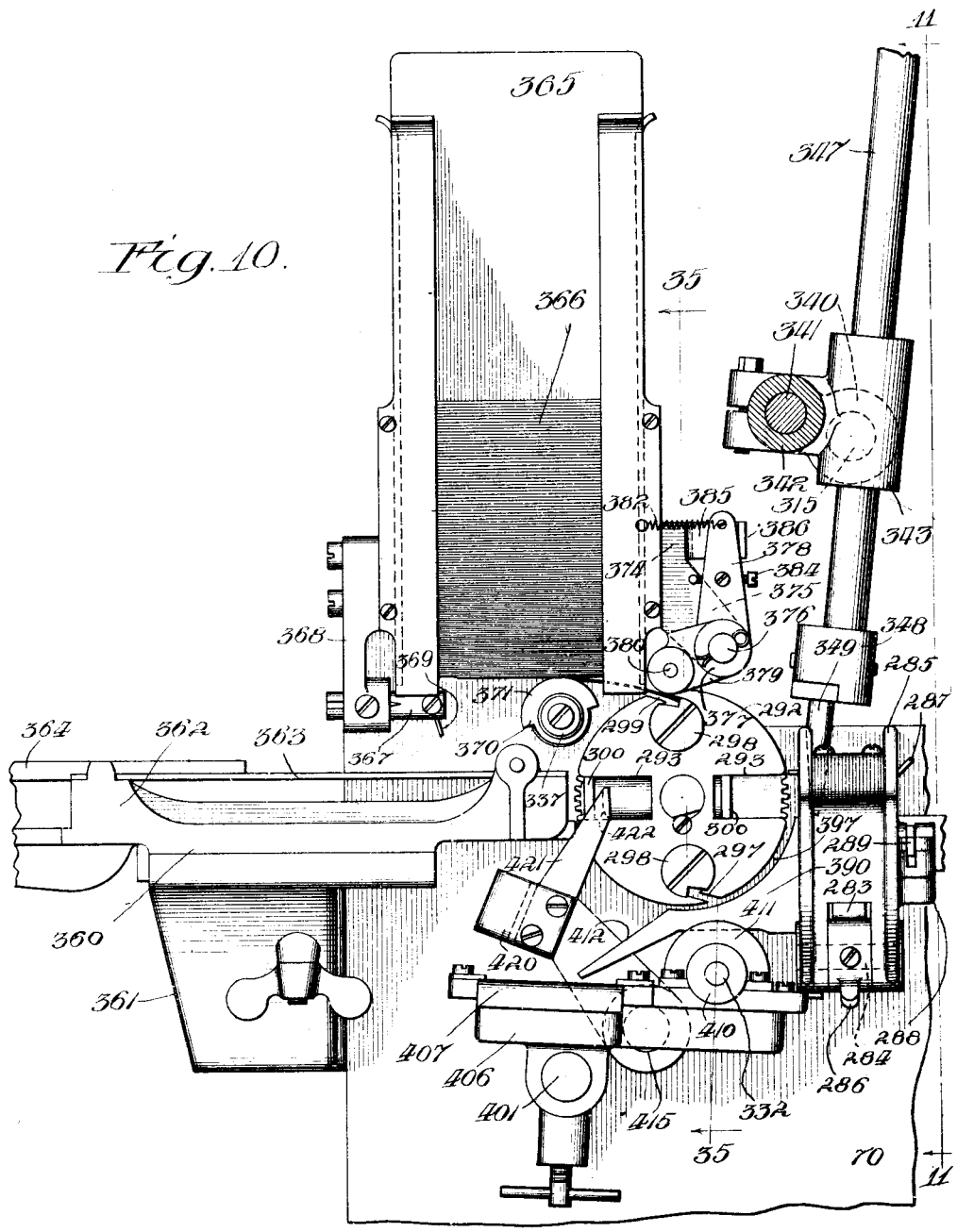

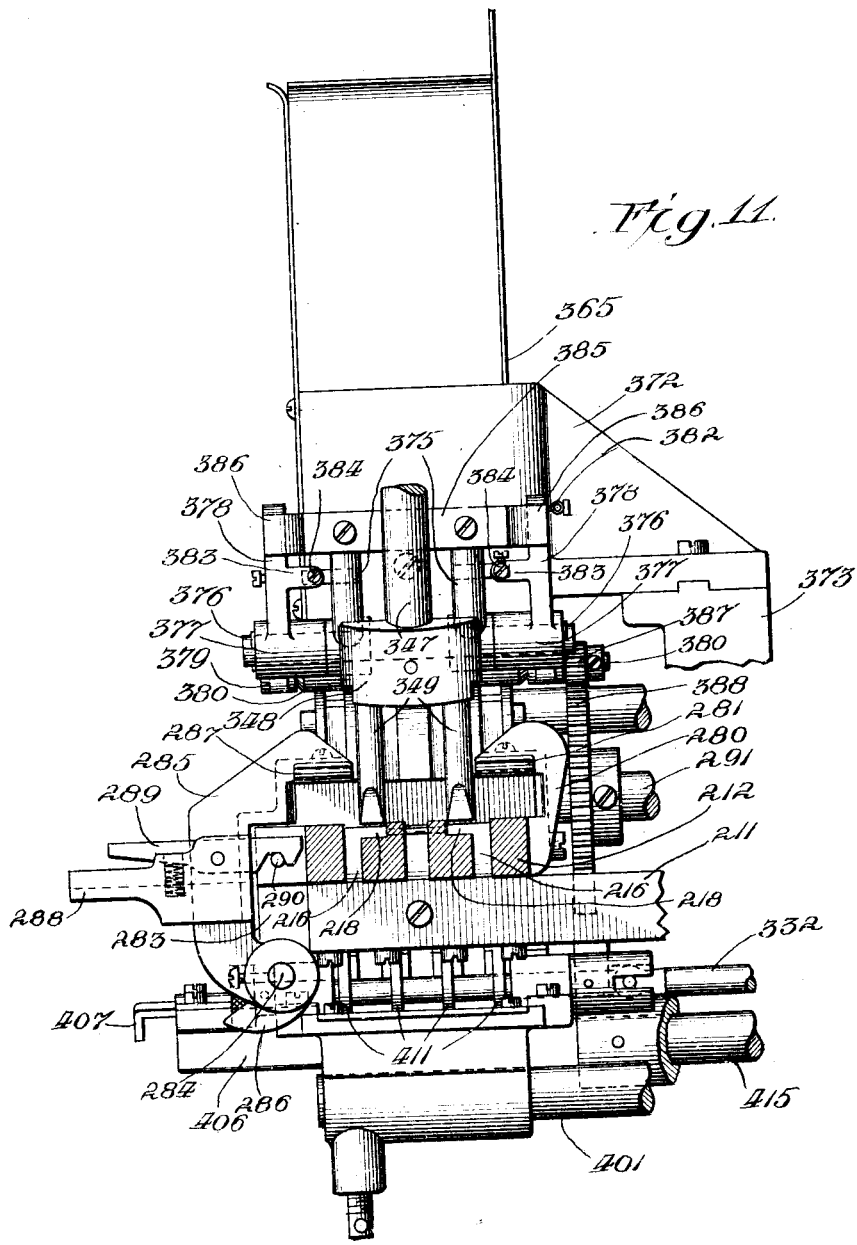

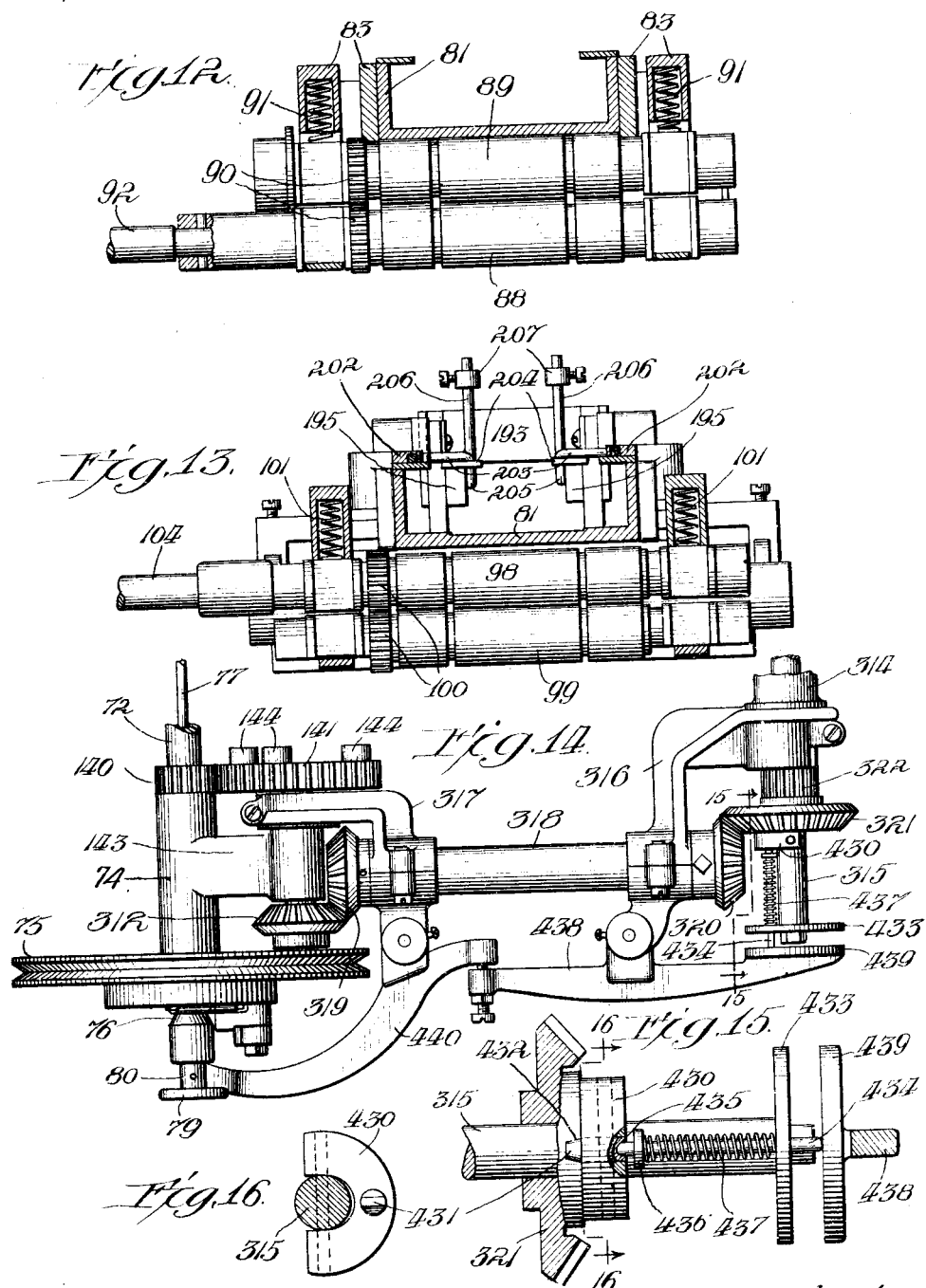

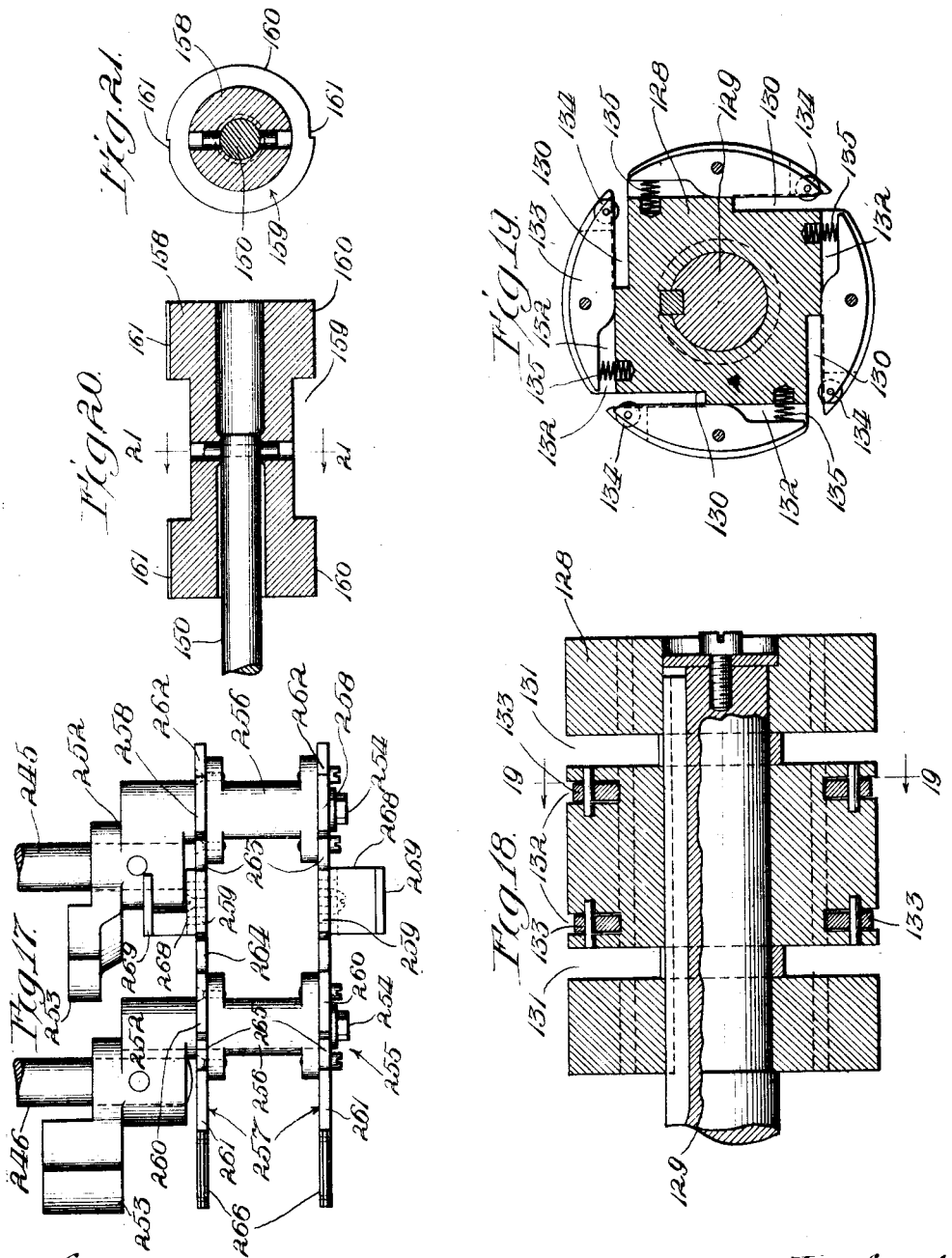

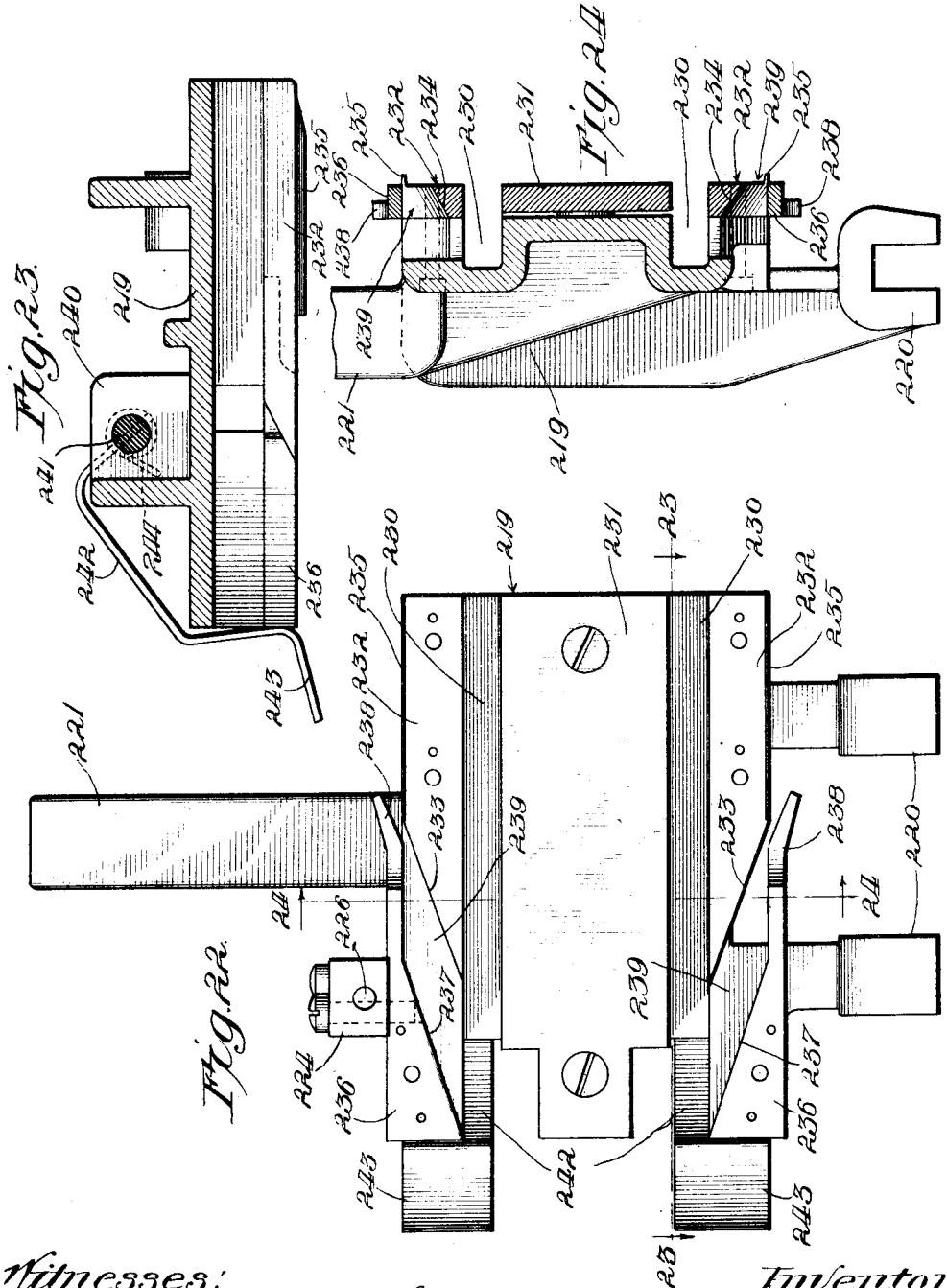

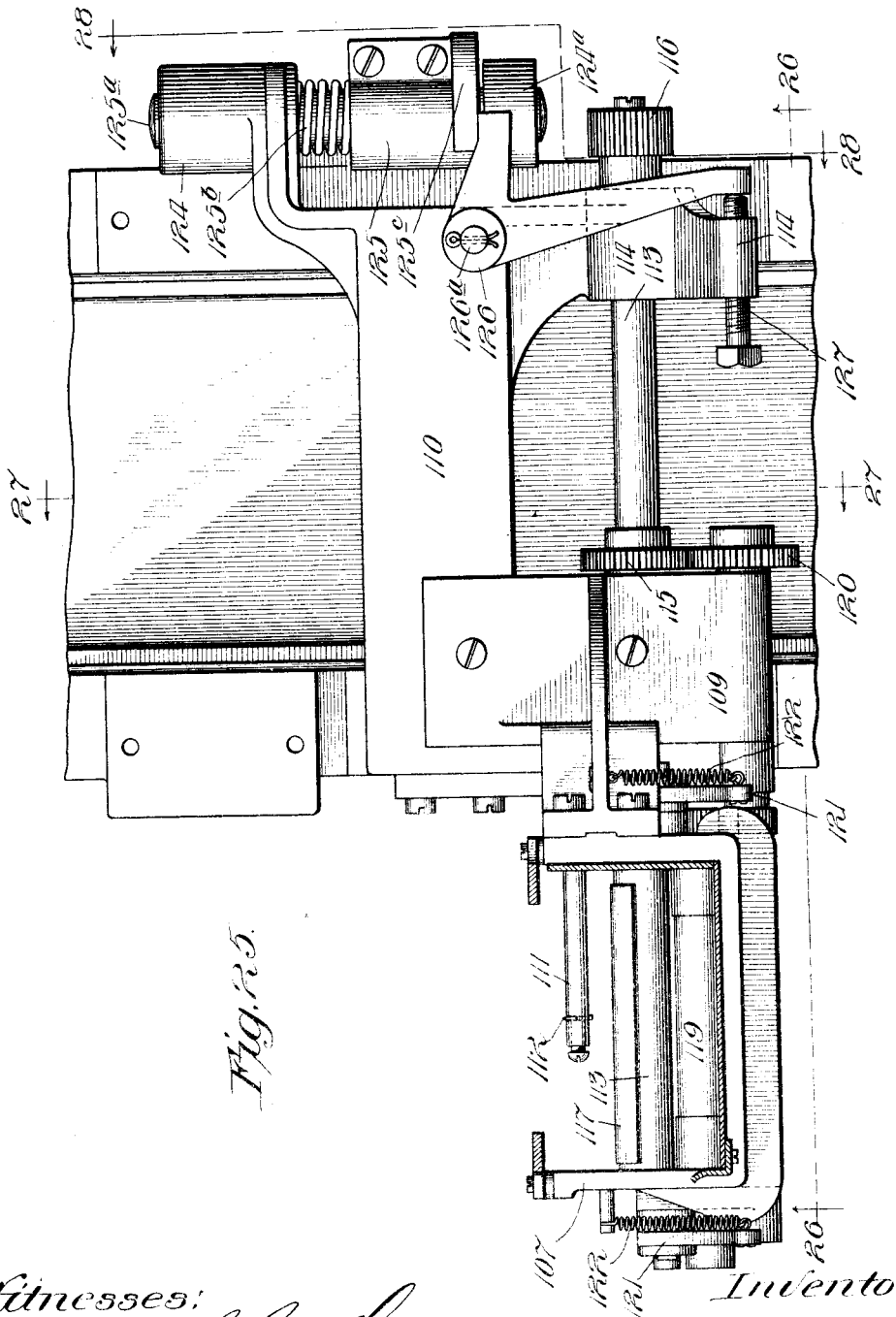

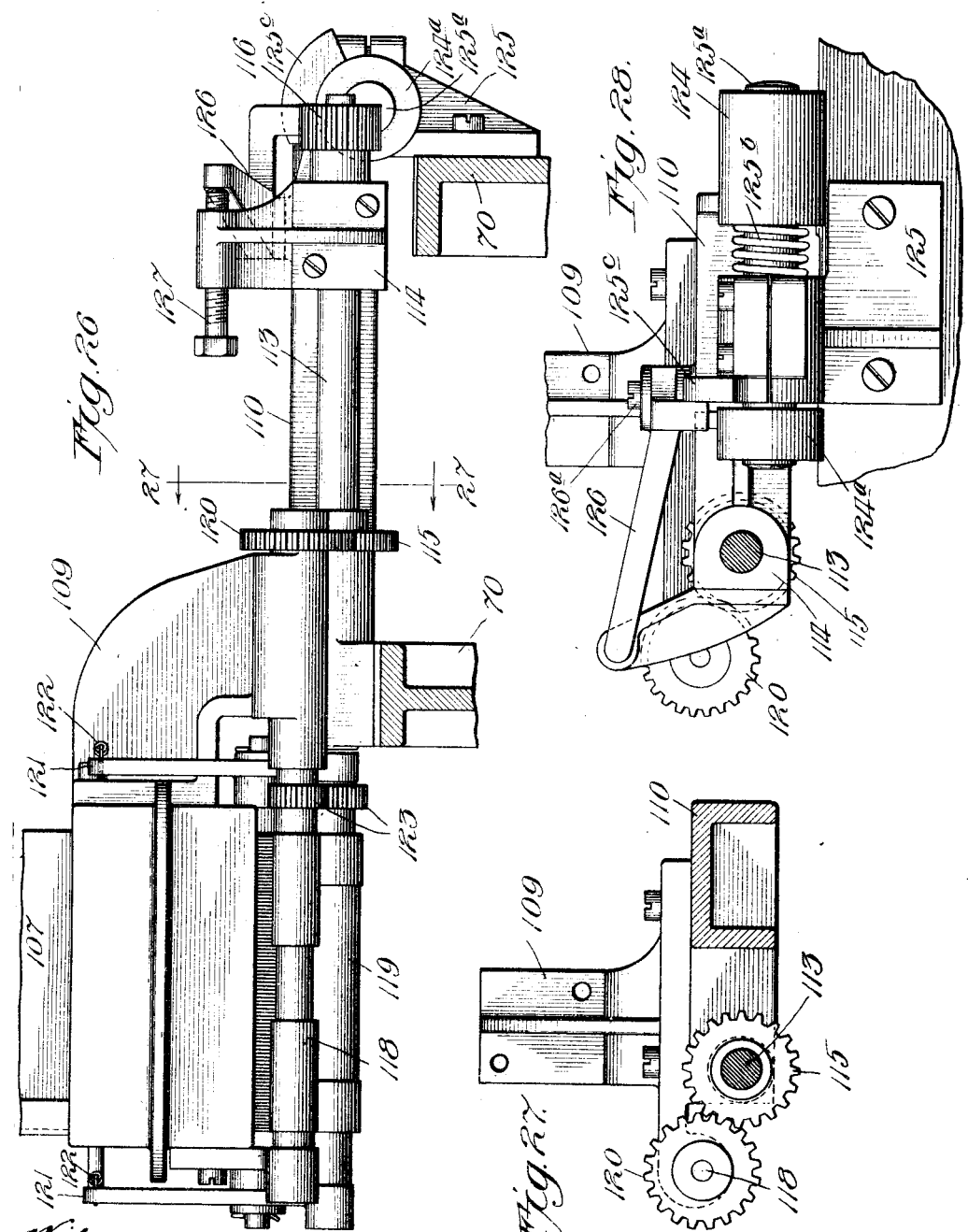

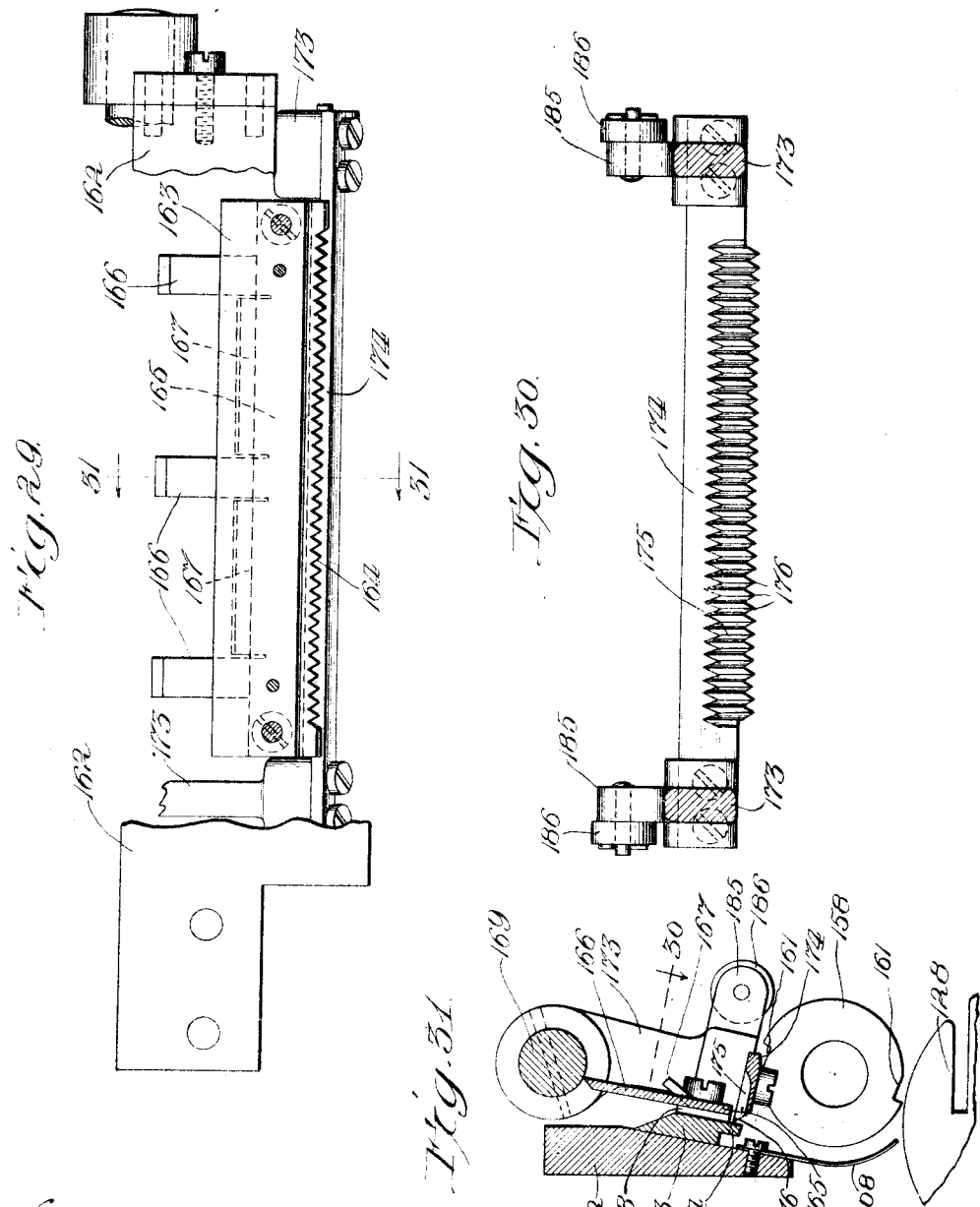

A. M. PRICE.
WRAPPING MACHINE.
APPLICATION FILED APR. 8, 1913.
1,185,822.
Patented June 6, 1916.
27 SHEETS—SHEET 18.
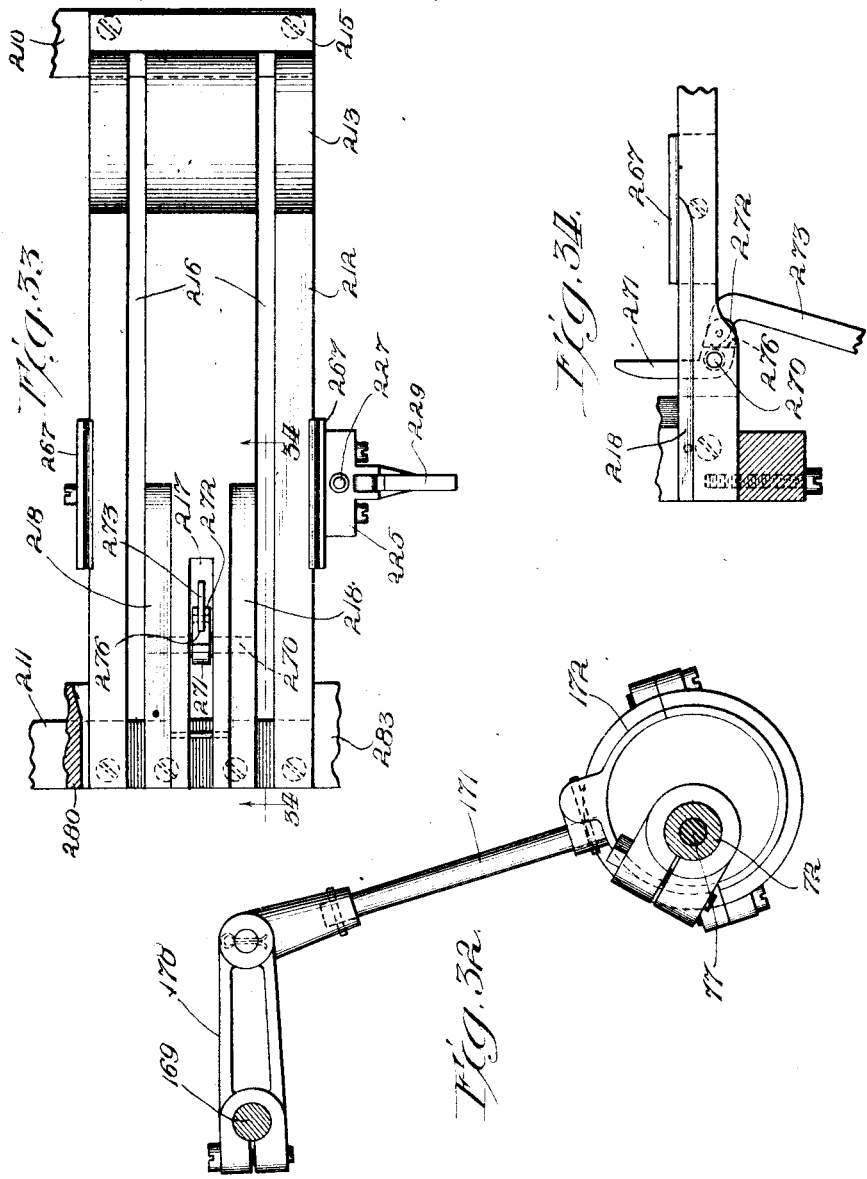

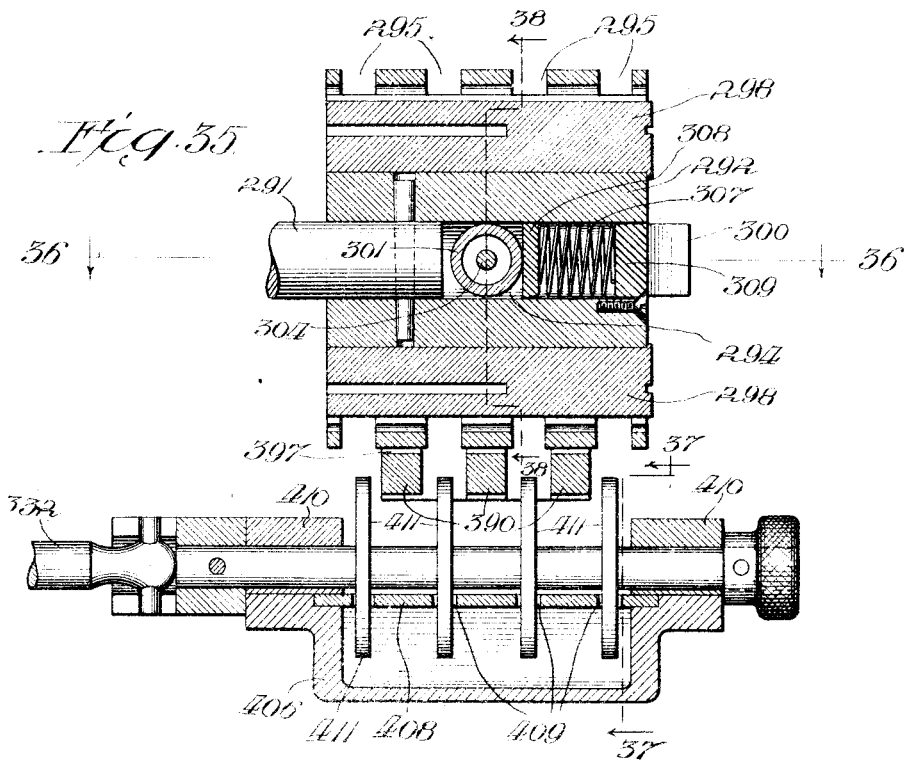
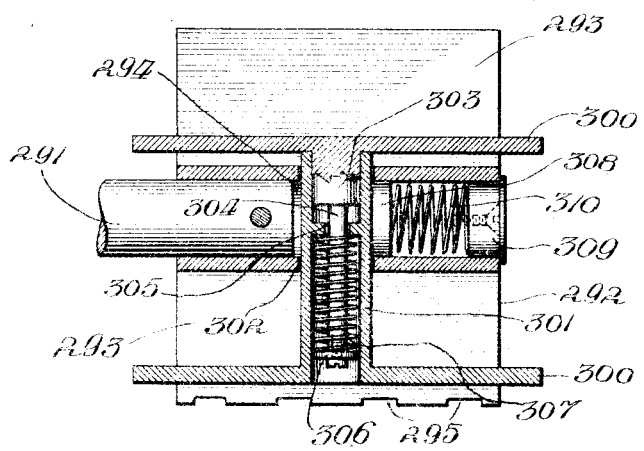

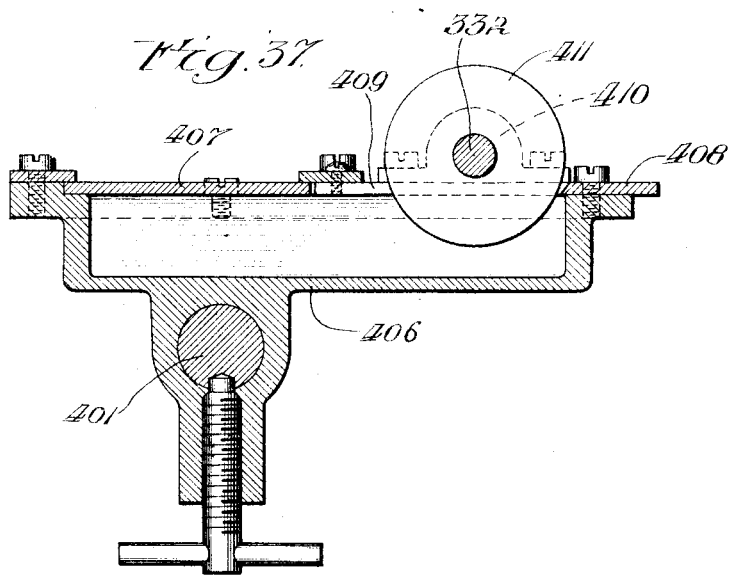
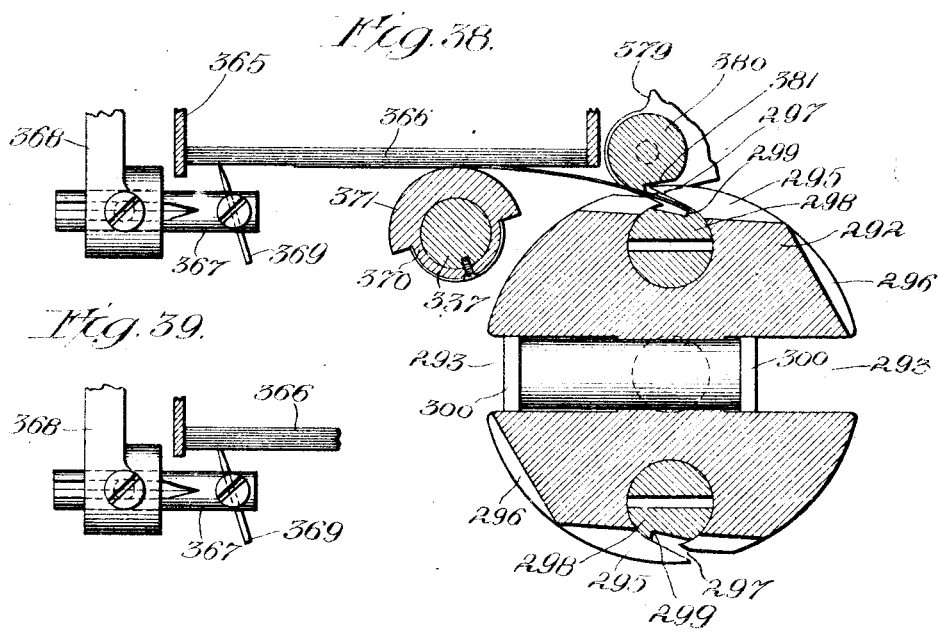

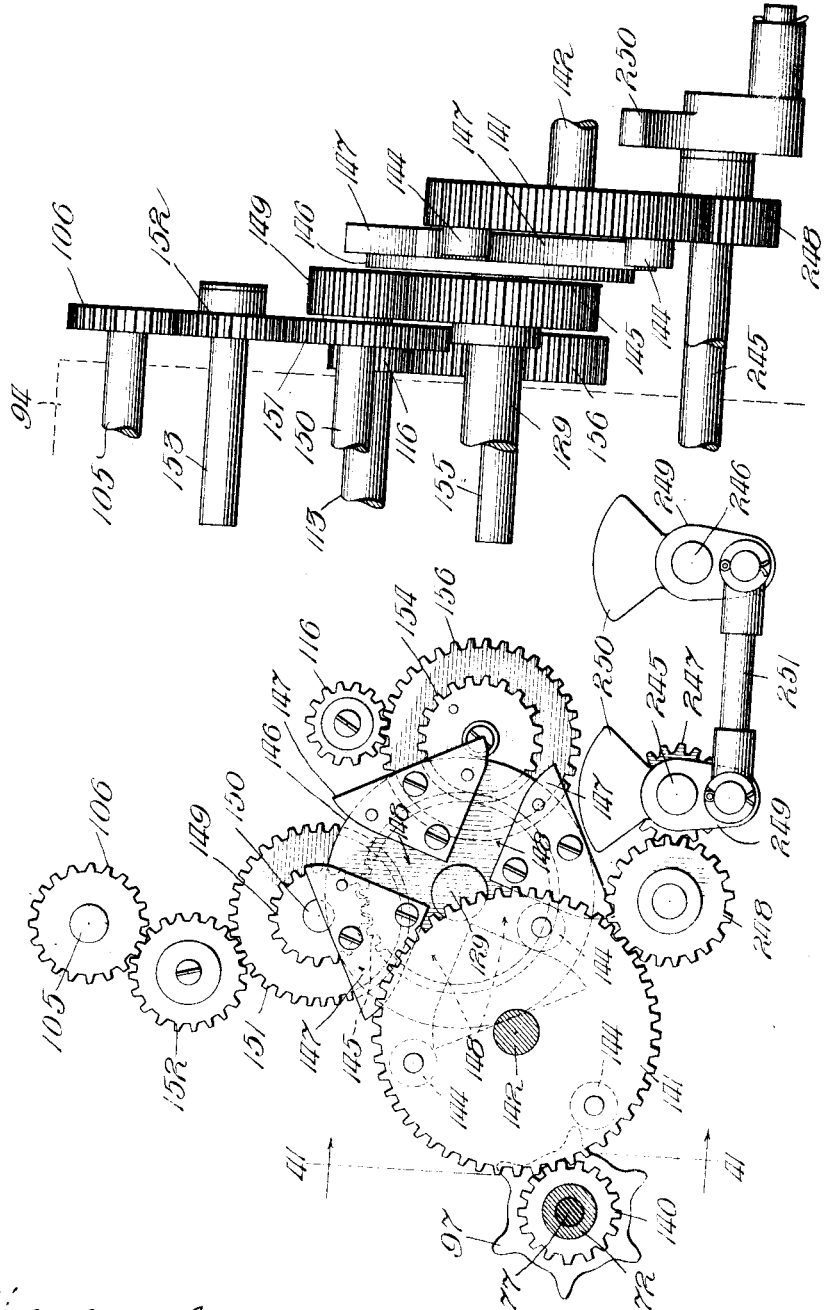

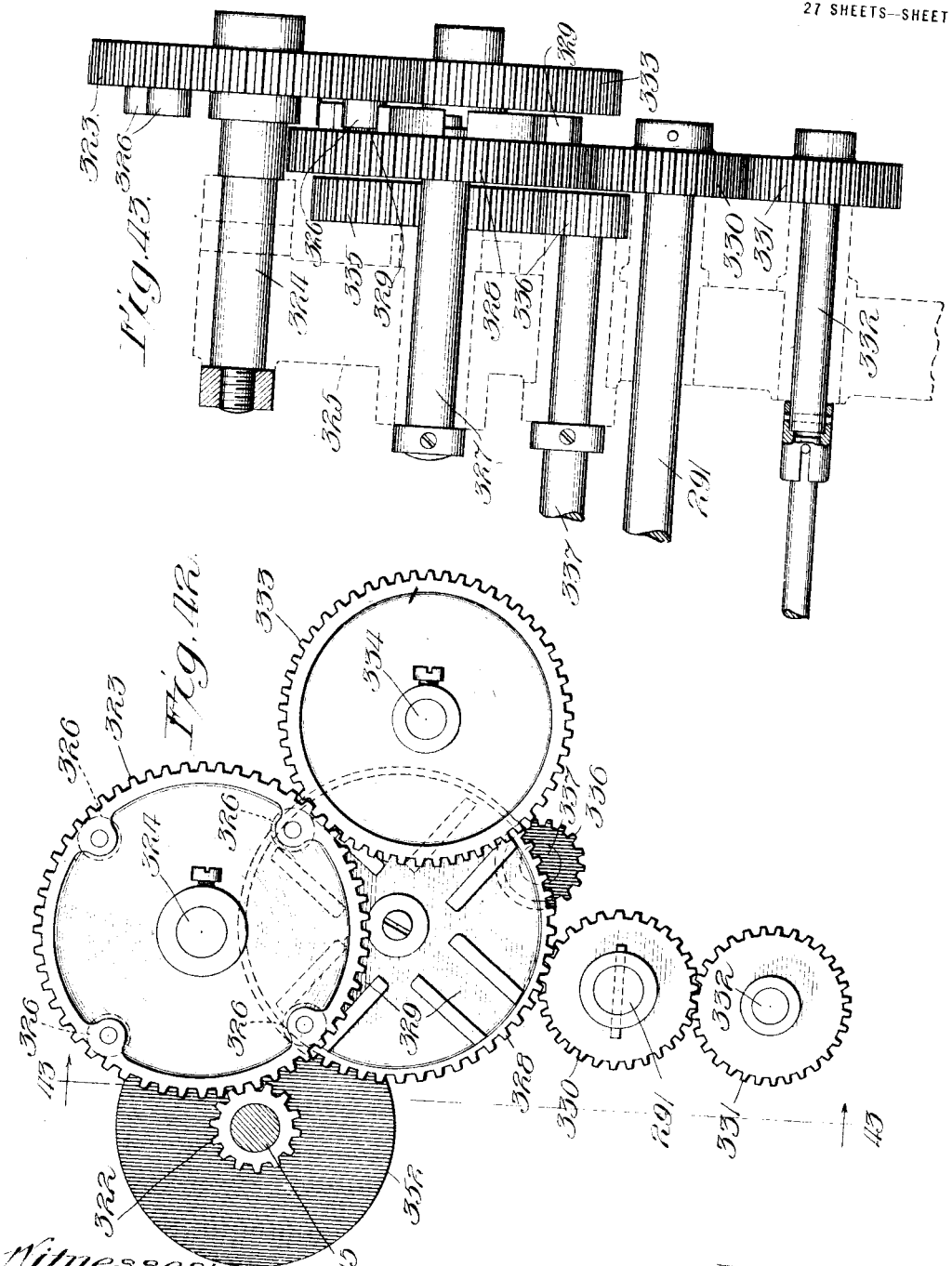

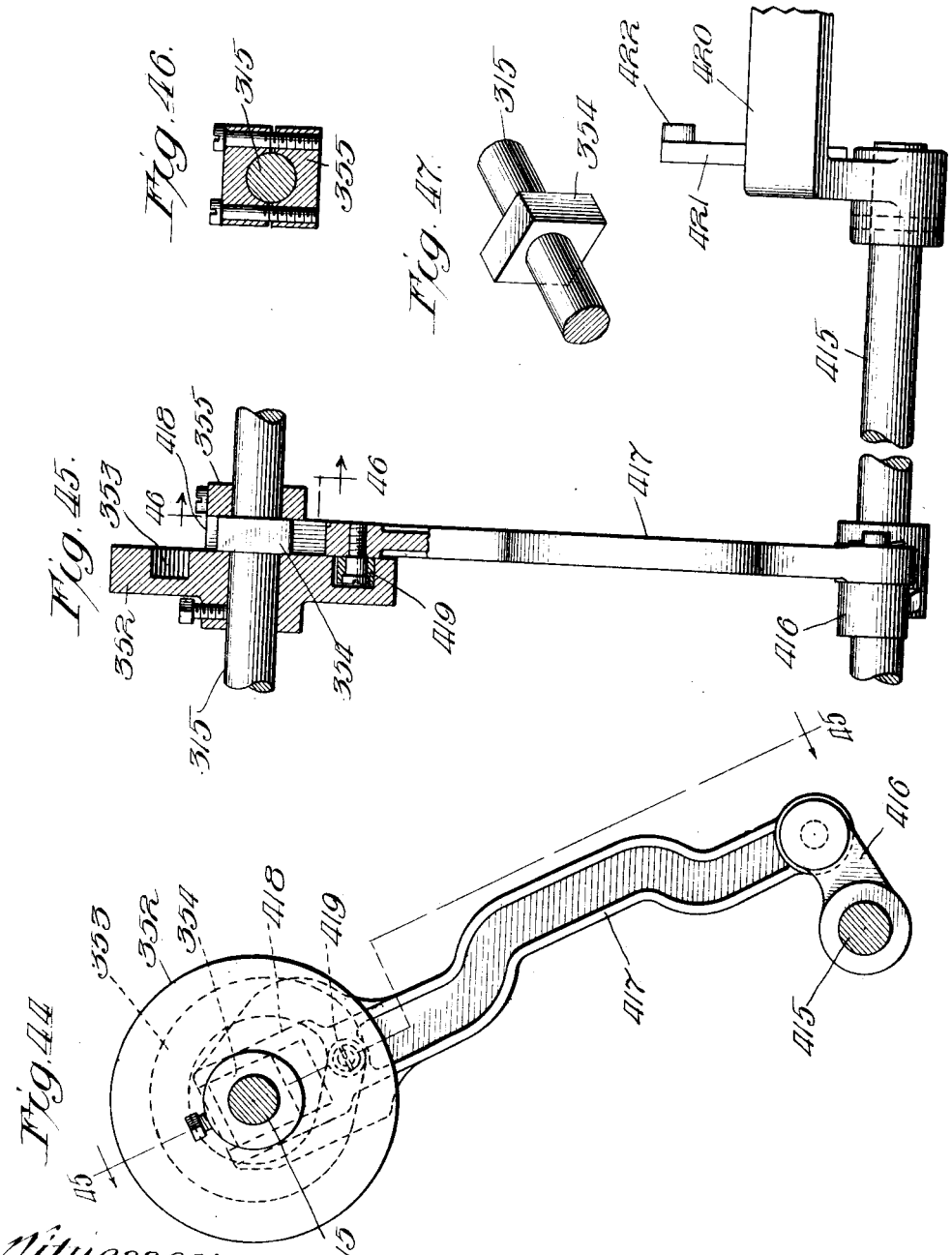

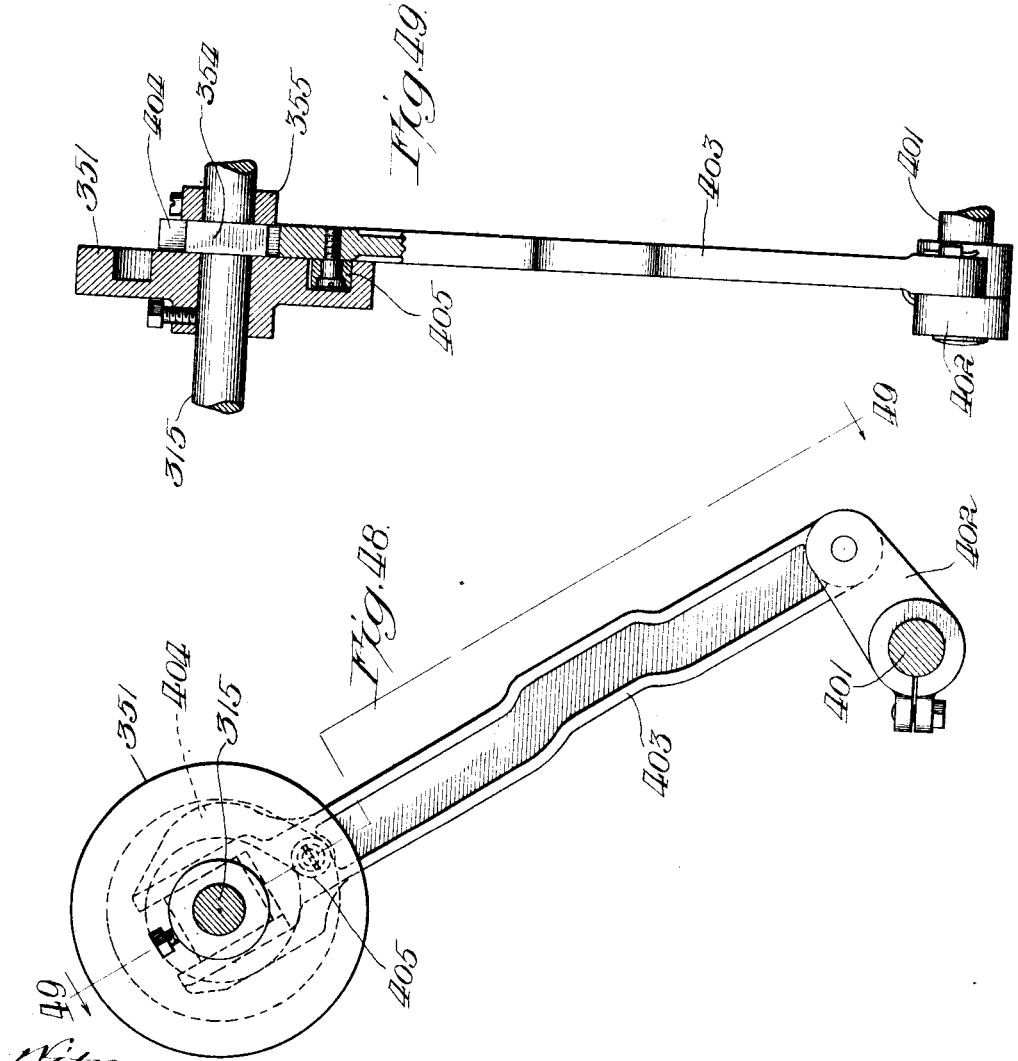

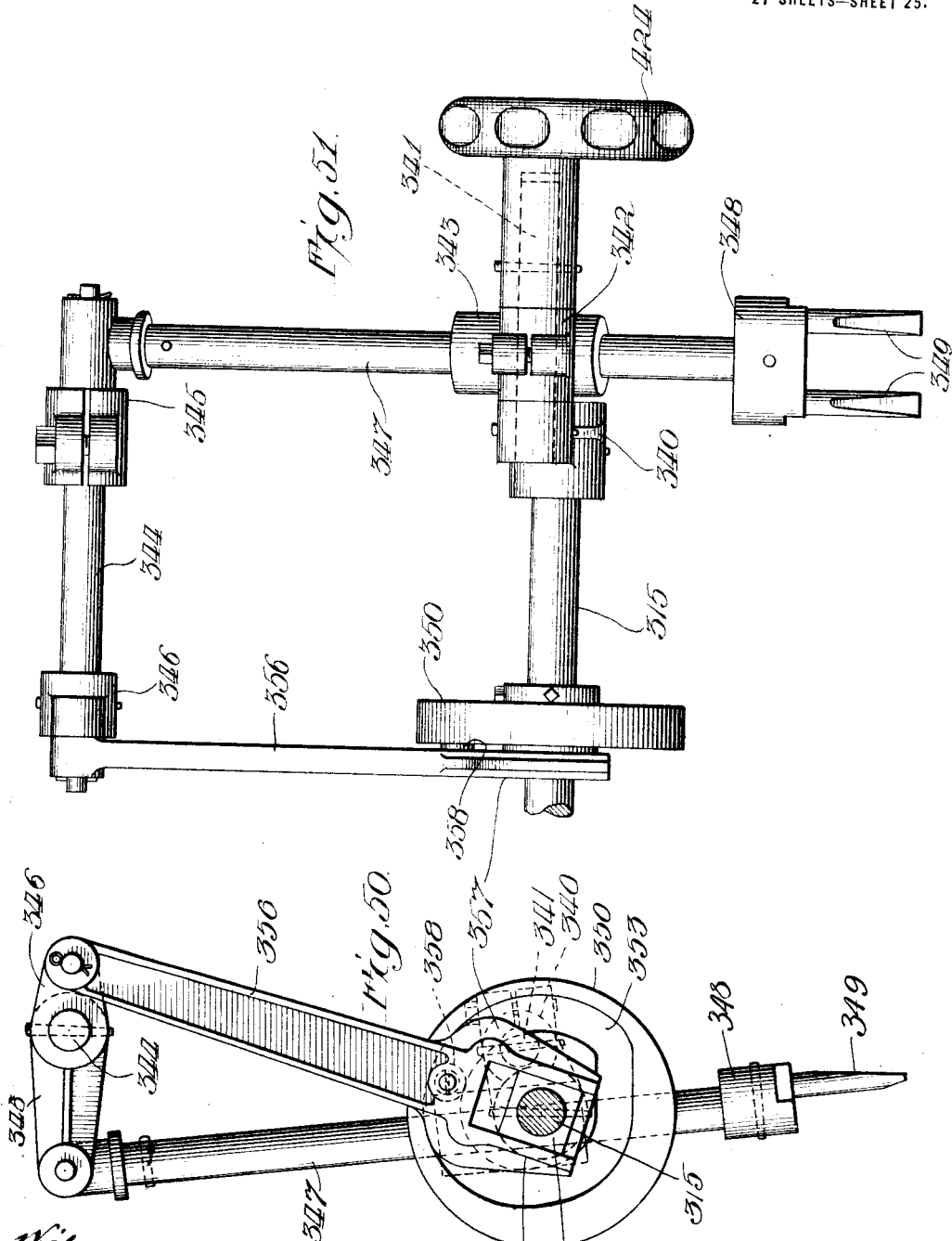

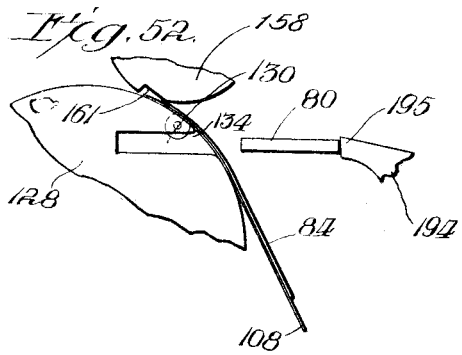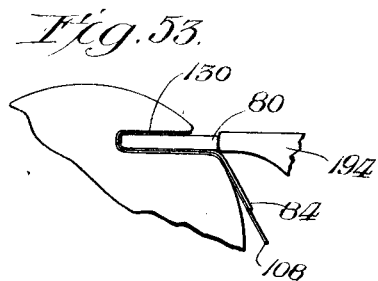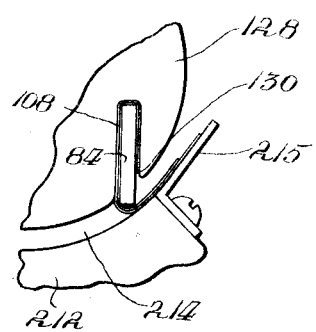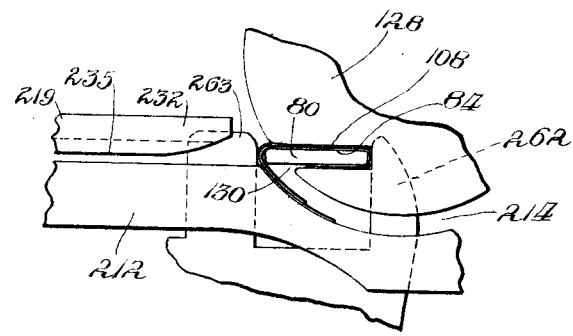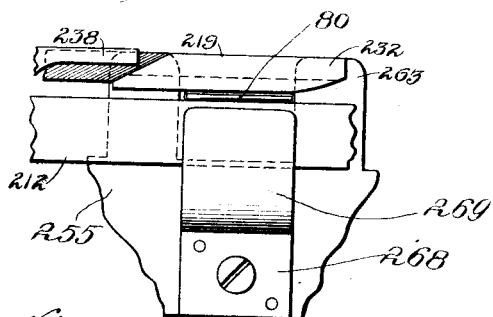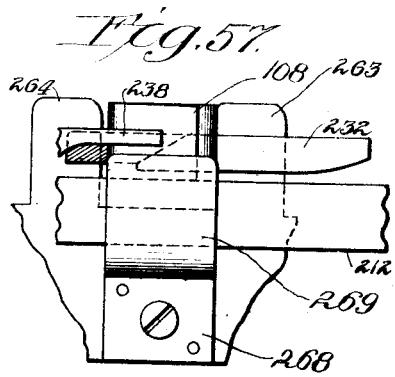

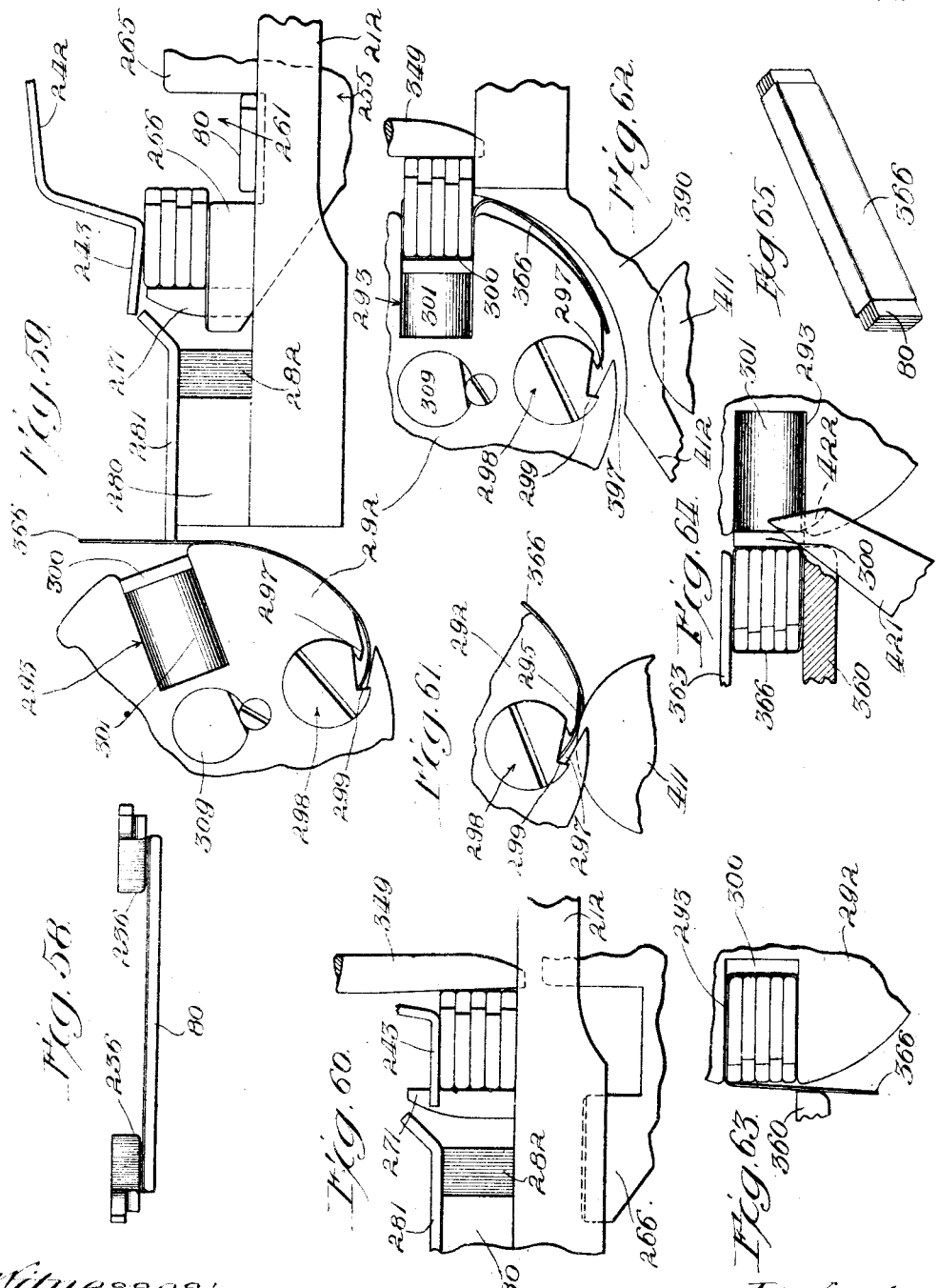

UNITED STATES PATENT OFFICE.

ALBERT M. PRICE, OF ELGIN, ILLINOIS.

WRAPPING-MACHINE.

1,185,822.     Specification of Letters Patent.     Patented June 6, 1916.

Application filed April 8, 1913. Serial No. 759,657.

*To all whom it may concern:*

Be it known that I, ALBERT M. PRICE, a citizen of the United States, residing at Elgin, in the county of Kane and State of Illinois, have invented new and-useful Improvements in Wrapping-Machines, of which the following is a specification.

My invention relates to improvements in machines for applying wrappers to small articles such, for example, as sticks of chewing-gum; my object being to provide a machine of this character of a generally improved and perfected construction which renders it very compact, strong and durable, as well as particularly quick, smooth-running and reliable in operation.

In the accompanying drawings I show a machine of my improved construction adapted for wrapping and forming packages of rectangular and flat-sided sticks of chewing-gum in the conventional way, by applying to each individual stick an inner wrapper, of water-proof paper, and an outer paper wrapper or label, then assembling the wrapped sticks into bundles of five and finally binding the bundle with a band or label, the ends of which are pasted together, to complete the package.

Figure 1:
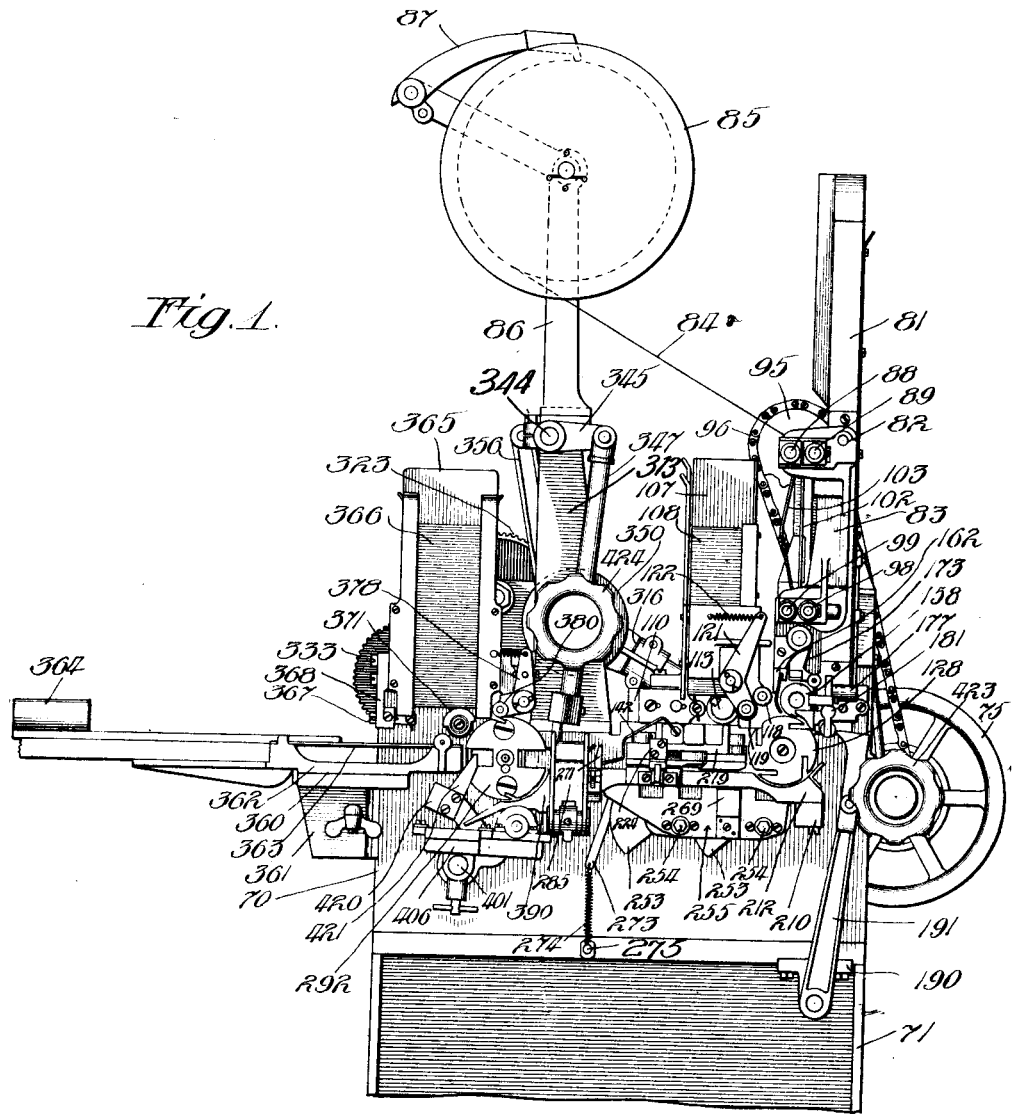
Figure 2:
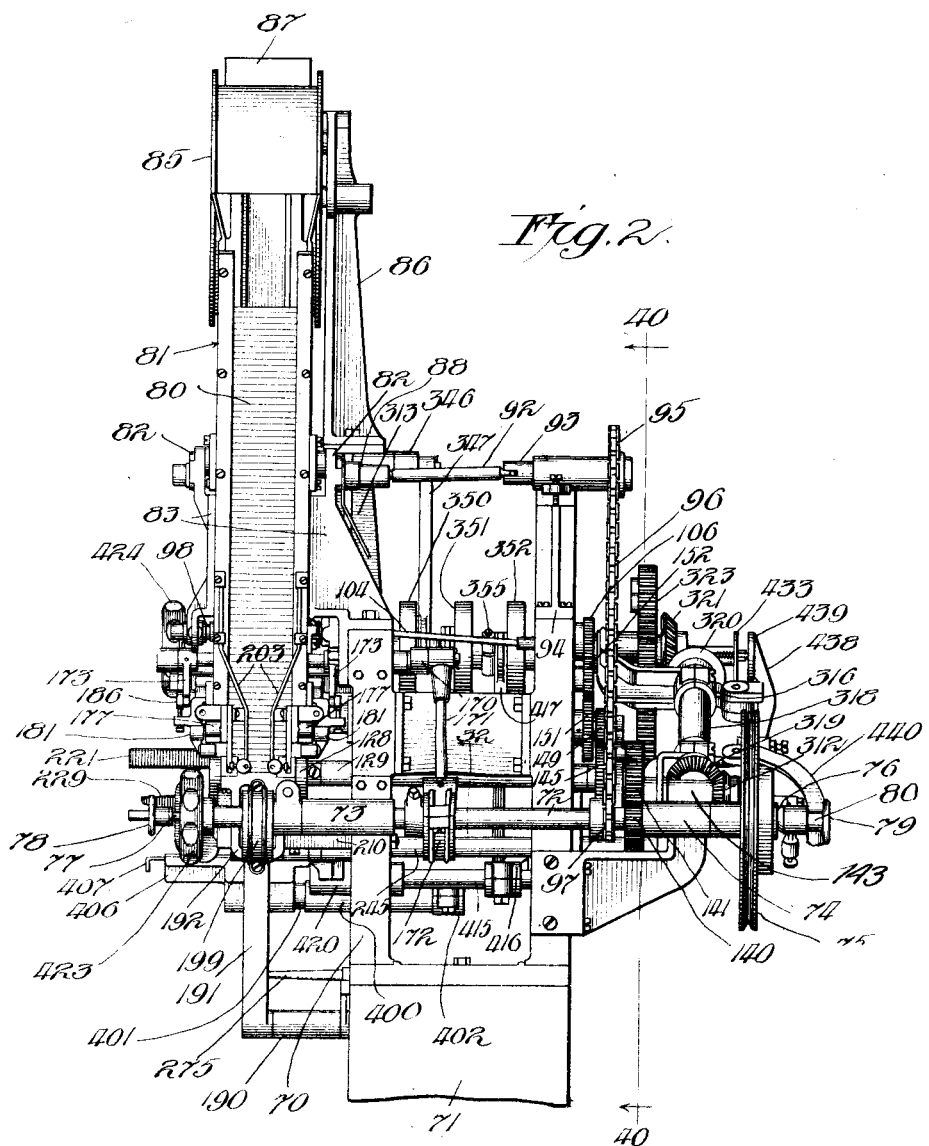
Figure 3:
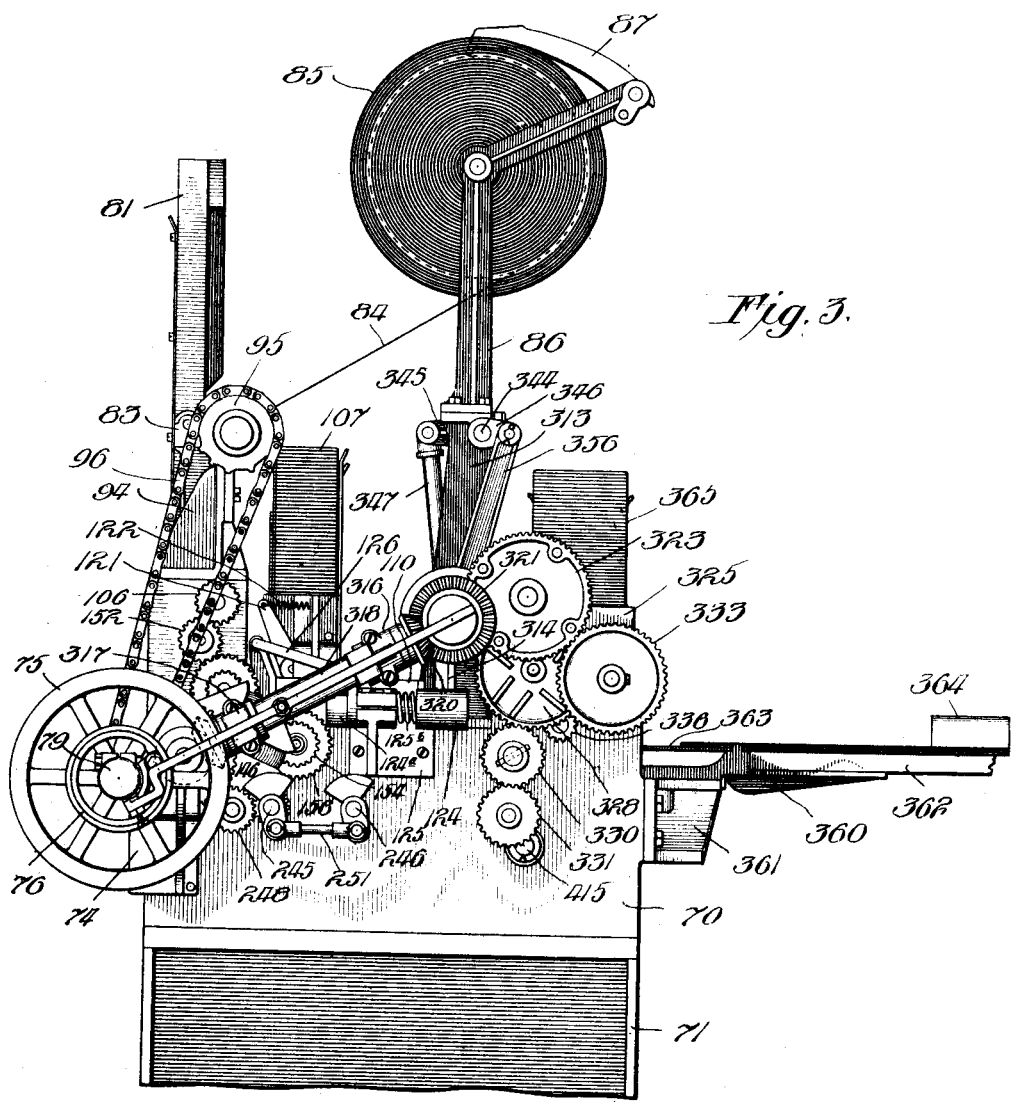

Referring to the drawings,—Figure 1 is a front elevation of the machine; Fig. 2, a view in elevation of the right-hand side of the machine; Fig. 3, a similar view of the rear side of the machine; Fig. 4, a similar view of the left-hand side of the machine; Fig. 5, an enlarged broken elevation of a portion of the front of the machine with a part in section; Fig. 6, an enlarged broken view of a portion of the right-hand side of the machine partly in section, the section being taken on line 6 in Fig. 5; Fig. 7, a section taken on line 7 in Fig. 6; Fig. 8, a broken, partly sectional view taken at line 8 in Fig. 7; Fig. 9, a similar view taken at line 9 in Fig. 7; Fig. 10, a broken elevation of a portion of the front of the machine with a part in section, the view being in effect a continuation of the view shown in Fig. 5; Fig. 11, a broken sectional view, the section being taken on line 11 in Fig. 10; Figs. 12 and 13, broken plan sections taken respectively on lines 12 and 13 in Fig. 9; Fig. 14, an enlarged broken plan view showing details of the main drive and safety-clutch mechanism; Fig. 15, a broken and partly sectional view of the safety-clutch mechanism, the section being taken on line 15 in Fig. 14; Fig. 16, a section taken on line 16 in Fig. 15; Fig. 17, a detail plan view of a movable transporter coöperating with other stationary and movable details to fold the ends of the wrappers and assemble the wrapped sticks into bundles; Fig. 18, an enlarged broken section taken on line 18 in Fig. 5; Fig. 19, a section taken on line 19 in Fig. 18; Fig. 20, an enlarged section taken on line 20 in Fig. 5; Fig. 21, a section taken on line 21 in Fig. 20; Fig. 22, a detail bottom plan view of one of the features of the wrapper-end folding and bunch-assembling mechanism with which the transporter shown in Fig. 17 coöperates; Figs. 23 and 24, sections taken respectively on lines 23 and 24 in Fig. 22; Fig. 25, a broken partly sectional plan view, taken on line 25 in Fig. 7, showing an adjustable hinged frame carrying the label-magazine and intermittently actuated mechanism for feeling the outer wrapper or label against the inner wrapper preparatory to the initial step of folding both wrappers around a stick of gum; Fig. 26, a section taken on line 26 in Fig. 25 and showing features of the same mechanism in elevation; Fig. 27, a section taken on line 27 in Figs. 25 and 26; Fig. 28, a broken end-view partly in section of the features shown in Figs. 25 and 26, the section being taken on line 28 in Fig. 25; Fig. 29, an enlarged view taken from line 9 in Fig. 7 with par' broken away and illustrating details of construction of cutter mechanism for severing a web of paraffin-paper to form the inner wrappers; Fig. 30, a section taken on line 30 in Fig. 31 and showing the lower vibratory cutter-blade; Fig. 31, a section taken on line 31 in Fig. 29; Fig. 32, an enlarged section taken on line 32 in Fig. 2 and showing an eccentric on the main shaft for rocking the shaft which carries the swinging cutter-blade; Fig. 33, a plan view of a stationary table-portion of the main-frame along which the sticks are advanced by the transporter during the folding of the wrapper-ends; Fig. 34, a broken section taken on line 34 in Fig. 33; Fig. 35, an enlarged section taken on irregular line 35—35 in Fig. 10 through the outer-binder applying and pasting mechanisms; Fig. 36, a section taken on line 36 in Fig. 35; Fig. 37, a section taken on line 37 in Fig. 35; Fig. 38, a broken sectional-view taken on line 38 in Fig. 35 and showing details of the mechanism for sliding the lowermost package-binder or label from a stack and wrapping it about the package; Fig. 39, a view of certain of the features of construction illustrated in Fig. 38 and showing the way in which the lowermost binders or labels of the stack are supported upon and penetrated by a needle which operates to prevent more than one of the labels from being withdrawn at a time; Fig. 40, an enlarged section taken on line 40 in Fig. 2 showing the main driving gears; Fig. 41, a view taken from line 41 in Fig. 40; Fig. 42, an enlarged section taken on line 42 in Fig. 4 and showing gears which operate the mechanisms for advancing the assembled wrapped sticks, applying the outer binder and discharging the package thus formed; Fig. 43, a broken view partly in section taken from line 43 in Fig. 42; Fig. 44, an enlarged section taken on line 44 in Fig. 4 and showing cam-mechanism which operates the package-discharger; Fig. 45, a broken and partly sectional elevation of details of construction of the package-discharging mechanism, the view being taken on line 45 in Fig. 44; Fig. 46, a section on line 46 in Fig. 45; Fig. 47, a broken perspective view of a detail of the construction shown in Fig. 45; Fig. 48, an enlarged section taken on line 48 in Fig. 4 and showing the cam mechanism which operates the paster for the outer package-binders or labels; Fig. 49, a broken partly sectional view taken on line 49 in Fig. 48; Fig. 50, an enlarged section taken on line 50 in Fig. 4 and showing the mechanism for moving the assembled wrapped sticks from the position where they are assembled into the binder-applying mechanism; Fig. 51, a view in elevation of the parts shown in Fig. 50; Figs. 52 to 64, inclusive, broken-views of successive features of the machine illustrating the progress of sticks of chewing-gum, the manner in which the wrappers are applied thereto, the way they are assembled into bunches of five, the way an outer package-binder or label is applied thereto, and the way the package is discharged; and Fig. 65, a completed package in perspective.

The main-frame 70 of the machine is mounted upon a base or standard 71.

The reference numeral 72 designates a hollow main-drive-shaft journaled in brackets 73, 74 on the right-hand side of the main-frame. Loosely journaled on the main-shaft is a drive-pulley 75, the shaft and pulley being equipped with engaging and releasing clutch members 76 of well known construction actuated by a longitudinally movable clutch-rod 77 extending through the hollow drive-shaft and provided at one end with a handle 78, and at its opposite end with a handle 79 formed with an annular socket 80. The movement of the clutch-rod 77 to the left in Fig. 2, by either of its handles 78 or 79, causes the pulley 75 to engage and rotate the main drive-shaft 72, while by forcing the clutch-rod to the right in Fig. 2 said shaft is released from the drive-pulley.

The sticks of chewing-gum 80 to be wrapped are stacked in a rectangular, vertically disposed magazine 81 mounted on trunnions at 82 toward the top of a standard or bracket 83 forming part of the main-frame. When desired, the magazine may be swung on its trunnions outward at its lower end to give access, when desired, to adjacent mechanisms.

The paraffined paper 84, intended for the inner wrappers of the individual sticks of gum, is wound upon a spool 85 journaled on a stationary standard 86. Bearing upon the paper in the spool is a pivotal tensioning weight 87. Journaled in the upper end of the bracket 83 is a pair of parallel paraffined-paper feed-rollers 88 and 89 (see Fig. 12) carrying intermeshing pinions 90 and held together under yielding pressure by springs 91. The roller 88 is flexibly connected with the end of a shaft-section 92 which at its opposite end is flexibly connected with a shaft-section 93 rotating in a bearing at the top of a standard 94. The joints at the ends of the shaft-section 92 permit the roller 88 and shaft-section 93 to rotate slightly out of alinement for convenience of construction; and the shaft-section 93 carries a sprocket-wheel 95 geared by means of a drive-chain 96 to a sprocket-wheel 97 (see Fig. 40) on the main drive-shaft 72. Beneath and parallel with the rollers 88, 89 is a pair of paraffined-paper feeding rollers 98, 99 (see Fig. 13) carrying intermeshing pinions 100 and held yieldingly together under pressure by the springs 101. Extending from the bite of the rollers 88, 89 to the bite of the rollers 98, 99 are two similar pairs of guide-wires 102, 103, the latter of which are bent between the rollers as shown in Fig. 7. The roller 98 is connected by means of a shaft, or shaft-section, 104 with a shaft-section 105 journaled in the standard portion 94 of the main-frame and carrying a pinion 106 beyond the said standard (Figs. 2, 40 and 41). The intermediate shaft-section 104 is connected with the roller 98 and shaft-section 105 by flexible joints for convenience of construction and also to permit the roller 98 to yield slightly with reference to the roller 99 while feeding the web of paraffined paper between them.

The reference numeral 107 designates a magazine for holding a stack of outer wrappers or labels 108 for the individual sticks of gum. The magazine 107 is supported by a bracket 109 carried by an adjustable frame 110 hinged to the main-frame of the machine (see Figs. 25, 26).

Extending beneath and part way across the magazine 107 is a stationary rod 111 (Fig. 8) through which passes an inclined upwardly extending pin 112, upon the point of which the stack of labels 108 rests near its rear edge, as indicated in Fig. 7. Extending centrally across the lower end of the magazine 107 is a shaft 113 passing through a bearing in the frame 110, beneath its bracket 109, and through a bearing in an arm or bracket 114, forming an integral part of the frame 110. Close to the face of the bracket 109 the shaft 113 carries a pinion 115, and beyond the arm 114 it carries a pinion 116 (see Fig. 40). Beneath the magazine the shaft 113 is slotted and fitted with a rubber friction-strip 117. Journaled in the lower part of the supporting-frame of the magazine 107 on the bracket 109 is a pair of label feed-rollers 118, 119 set at an angle with relation to each other, as shown for example in Fig. 7. The shaft of the roller 118 passes through and is journaled in the bracket 109 and carries at its end a pinion 120 meshing with the pinion 115 on the shaft 113. The lower roller 119 is journaled at opposite ends in the short arms of companion levers 121 fulcrumed between their ends against opposite sides of the magazine frame. Springs 122 connected with the long arms of the levers 121, as shown in Figs. 5 and 25, operate to press the roller 119 yieldingly against the roller 118. The rollers 118 and 119 carry intermeshing gears 123 as shown in Fig. 26, whereby the roller 119 is rotated by the roller 118.

The frame 110 has bearing-ears 124, 124ᵃ, which embrace a bracket 125 on the main frame and are pivoted upon a hinge-pin 125ᵃ passing through the bracket in line with the pitch line of the pinion 116 at its outer sides (see Fig. 26). A stiff spring 125ᵇ (see Fig. 25) tends to press the frame 110 at its ear 124ᵃ against the bracket 125. The bracket 125 has a segmental shoulder 125ᶜ which is engaged by one arm of a bell-crank lever 126, fulcrumed at 126ᵃ on the frame 110, which bears at its other arm against an adjusting set-screw 127 passing through the bracket 114. The frame 110 may be raised on its hinge, at 125ᵃ, to give access to the underside of the magazine and adjacent mechanisms, and when down in normal position it rests horizontally on the main-frame 70. The frame 110 and parts carried thereby may be adjusted toward and away from the magazine 81, for the purpose hereinafter explained, by turning the set-screw 127.

Located between the lower end of the magazine 81 and the rollers 118, 119, as shown for example in Fig. 7, is a drum 128 shown in detail in Figs. 18 and 19. This drum is keyed upon a shaft 129 which is journaled in bearings in the main-frame across which it extends parallel with the shafts 104, 113. The drum 128 is provided with four tangentially disposed pockets 130, extending from end to end of the drum, and two deep annular grooves 131. In the periphery of the drum between the grooves 131 are two parallel series of recesses 132, one of each series being in open communication with one of the pockets 130. Each recess 132 is fitted with a rocking-clamp 133 carrying a clamping-roller 134 projecting into the pocket under pressure of a spring 135.

The driving-gears for the mechanisms described are shown most plainly in Figs. 40 and 41. On the constantly rotating drive-shaft 72 is a pinion 140 meshing with a gear 141 which is carried by a shaft 142 journaled in the bracket 74 (see Figs. 2 and 14). On the face of the gear-wheel 141 is an annular series of three short studs or rollers 144 equi-distant apart. The shaft 129 (carrying the drum 128) is provided beyond the part 94 of the main-frame with a gear-wheel 145 and a disk 146. Fastened against the outer face of the disk 146 are four V-shaped blocks 147 disposed as shown to form between them four radially-extending cam-slots or cam-grooves 148 with flaring outer ends, all as shown in Fig. 40. In the rotation of the gear 141 a roller 144 enters a cam-slot 148 on the wheel or disk 146 and moves toward the center of said wheel and then out of the slot, while bearing against the adjacent cam-surface of the block 147, to turn the wheel 146 and shaft 129 a quarter revolution. The flaring outer ends of the cam-slots 148 are rounded in the arc of a circle of which the shaft 142 of the gear 141 is the center, whereby while initially entering and finally leaving a cam-slot the rollers 144 exert no pressure against the blocks 147. Thus while the gear 141 rotates constantly it turns the wheel 146 and attendant parts intermittingly, there being a decided pause while rollers 144 are traversing the rounded ends of the cam-slots 148. As one roller 144 engages the wheel 146 before the roller in advance releases the same, there is positive engagement between the wheels 141, 146 at all times which prevents all danger of back-locking of the wheel 146 or advancing of the wheel 141, thus insuring accurate movement and timing of the intermittently driven parts. Meshing with the gear 145, on the shaft 129, is a pinion 149 on the end of a shaft 150. Also on the shaft 150 is a gear 151 engaging with an idle pinion 152 on a stationary shaft 153 on the part 94 of the frame. The pinion 152 drives the pinion 106 on the shaft 105.

From the foregoing explanation it will be understood that the shaft 92 and upper paraffined-paper web feeding-rollers 88, 89 rotate constantly, being driven from the main drive-shaft 72 through the drive-chain 96, while the lower paraffined-paper web-feeding rollers 98, 99 are rotated intermittingly from the pinion 106 (through the shaft sections 105, 104). The drum 128 is driven directly from the cam-wheel 146 through the shaft 129 and rotated intermittingly a quarter turn with each movement. Meshing with the gear-wheel 145 is an idle pinion 154 (see Fig. 40) carried on a stationary shaft 155 on the part 94 of the main-frame; and integral with the pinion 154 is a larger pinion or gear-wheel 156 meshing with the pinion 116 carried by the shaft 113 which operates the label-feed rollers 118 and 119 as before described. These latter rollers are rotated intermittingly and coincidently with the rollers 98, 99 and the drum 128.

Resting upon the drum 128 (see Fig. 7) is a friction roller 158 shown in detail in Figs. 20 and 21. It has a circumferential recess 159 between its ends to present only annular bearing surfaces 160, at its opposite end-portions, and in each of the parts 160 are the coincident diametrically opposed shallow recesses 161. The roller 158 is upon the end of the shaft 150 (before mentioned) the connection being such as to permit the roller to rock slightly with reference to the shaft, so that it will conform to and bear equally at its surfaces 160 against the drum 128. The roller 158 is rotated by the shaft 150 intermittingly and coincidently with the drum and intermittent rollers described.

Located between the lower-end portions of the magazines 81, 107 is a stationary bar 162 (see Fig. 7), to which is secured a stationary cutter-blade 163 (see Figs. 29 and 31) to one side of and parallel with the path of the web 84. The cutter-blade 163 has a serrated lower cutter-edge 164. Fastened against the blade 163 at opposite ends is a guide-strip 165 having three upwardly extending guide-fingers 166 and intervening outwardly bent portions 167. Between opposite end-portions of the blade 163 and plate 165 is a narrow space or web-guiding slot 168. Extending parallel with the upper edge of the bar 162 and journaled in the bracket-portion 83 of the frame is a horizontal shaft 169 provided at its inner end with a crank-arm 170 (see Figs. 2 and 32) connected by a pitman 171 with an eccentric 172 on the drive-shaft 72. Secured to the shaft 169 is a pair of downwardly extending arms 173 fastened against the lower ends of which is a movable cutter-blade 174 having a serrated cutter-face 175 terminating in projecting paper-penetrating points 176 having shearing edges on their opposite sides. In the rotation of the drive-shaft 72 the shaft 169 is rocked by the eccentric 172 and swings the cutter-blade 174 back and forth to and across the serrated edge 164 of the stationary blade 163 to sever the web of paper 84 fed between them. In the operation of the cutters, the blade 163 forms a backing for the web, and the pointed teeth of the blade 174 penetrate the web and intermesh with the teeth of the blade 163, shearing the web between the perforations. The teeth of the blade 174 do not contact with the teeth of the blade 163, and the web is severed by a serrated cut without danger of buckling the web between the blades.

Secured against opposite sides of the lower end of the magazine 81 are brackets 177 carrying a pair of stationary bent fingers 178 which extend under the magazine as shown in Figs. 5, 6, and 7 to form a support for the column of sticks of chewing-gum 80 to rest upon. Between the fingers 178 and lower straight-edged end of the magazine 81 is a delivery opening 179 large enough to permit the discharge through it of a single stick of chewing-gum.

Fulcrumed on pins 180 on the brackets 177 are a pair of gum-stick positioning levers 181 (see Fig. 6) provided at their lower ends with gum-positioning presser-feet 182 adapted to press against opposite ends of the lower sticks in the column to center them. On the levers 181 are arms 183 through which pass vertically-adjustable screws 184. On the lower ends of the swinging arms 173 are offsets 185 (see Figs. 7, 30, 31) carrying rollers 186 adapted to engage the tops of the screws 184 to press down the arms 183 of the levers 181 and force the gum-engaging presser-feet 182 toward each other to position the lower sticks of gum centrally of the magazine, as indicated in Fig. 6. When the screws 184 are released by the rollers 186 the levers 181 turn slightly on their pivots 180 to release the ends of the gum-sticks.

Fulcrumed at its lower end upon a bracket 190 on the main-frame (see Figs. 1 and 2) is a lever 191 having a bifurcated upper end portion 192 closed at the top by a head 193 (see Figs. 5, 6, and 7) carrying a pair of projections or pusher-blocks 194 having gum-stick engaging ends 195. Each block 194 has a longitudinally extending recess or slot 196 in its upper side (see Fig. 6) to clear and pass across the lower ends of the gum-stick supporting bars 178. The lever 191 is provided in its bifurcated part 192 with a shaft 197 at which it is connected by a short swinging connecting-rod 198 with an eccentric 199 on the main drive-shaft 72. In the rotation of the shaft 72 the lever 192 is swung upon its pivot at 190 to move the pusher 194 back and forth between a position slightly to the right of that shown in Fig. 7, and the peripheral face of the drum 128, to force the lowermost stick of gum 80 from the magazine into the adjacent drum-pocket 130.

In order that the sticks of gum stacked in the magazine 81 shall descend freely therein, the magazine is of somewhat greater internal dimensions than the gum-sticks, making it necessary to provide the positioners 182 operating as above described. The lower end-portion of the magazine is inclined in the direction of the drum 128 as shown at 200 in Fig. 7. Fastened at the points 201 and 202 against the opposite edges of the magazine 81 is a pair of springy-wire guides 203, which press normally against stationary stops 204. The wire-guides are coincidently bent, as most plainly shown in Figs. 6 and 7, to present the inclined gum-stick guiding parts 205, which extend into the lower end of the magazine, and the lower straight approximately horizontal end-portions 206 carrying adjustable stops 207. The stops 207 are in the paths of the rear, or right-hand, ends of the pusher-blocks 194.

The purpose of the mechanism thus far described is to feed an outer stick-wrapping label 108 from the magazine 107 on to the drum 128, feed a predetermined length of the web 84 of paraffined-paper, cut therefrom a desired length to form an inner wrapper for the stick of gum, position it on the drum with reference to the outer wrapper or label 108, turn the drum 128 to position one of its slots or pockets 130 in register with the lowermost stick of chewing-gum 80 in the magazine 81 (as indicated in the diagrammatic Fig. 52) then cause the pusher 194 to force the lowermost stick of gum into the registering pocket 130 to fold the wrappers (as indicated in Fig. 53). The operations of positioning the inner and outer wrappers 84, 108 and a pocket 130 with reference to the lowermost stick of gum 80 (as shown in Fig. 52) and of forcing the gum and wrappers into the pocket (as shown in Fig. 53) are all performed in each revolution of the constantly rotating drive-shaft 72.

To insure proper delivery of a stick of gum by the pusher 194 from the lower end of the stack with each operation, it is necessary that the stick shall lie horizontally upon the supporting arms 178 so that it may pass freely through the slot 179. As before stated, the interior cross-sectional dimensions of the magazine 81 are, in practice, slightly greater than the dimensions of the gum-sticks to permit a column of the latter to descend as freely as possible. The separate pieces of gum may, in instances, adhere slightly to each other and in the case of a straight column of gum-sticks the lowermost one is apt, in practice, and in spite of the weight of the column, to cant in such a way as to permit the pusher to slide beneath it, instead of engaging and pushing it through the delivery slot. The lower end-portion of the column of gum-sticks 80 is pressed by the guide-wires 205 approximately against the inclined magazine surface 200, so that it extends at a sufficient incline with reference to the main-body of the column to shift the lower-most stick, at its rear edge, in line with the center of the vertical portion of the column, whereby its rear edge is approximately in line with the center of gravity of the column, which insures its being pressed down into the path of the pusher 194 and delivered through the slot 179. In the final retracting movement of the pusher 194 it strikes the stops 207 on the resilient guide-wires 205 and swings them slightly in the direction to the right in Fig. 7 to force their bent parts 205 away from the lower end of the column, so that the latter may descend freely. In the initial advance of the pusher 194 to engage and discharge the lowermost stick, it moves away from the stops 207, permitting the guide-wires to again exert pressure against the column.

The web of paraffined-paper 84 passes from the spool 85 between the continually rotating upper feed-rollers 88, 89 and between the guide-wires 102, 103 to the lower intermittent feed-rollers 98, 99. From thence it is guided between the shaft 169 and lower ends of the wires 103 (see Fig. 7) and by the guide-fingers 166 and guide-slot 168 across the face of the stationary cutter 163, thence between the friction feed roller 158 and the stationary curved guide 208 to and between the drum 128 and said feed-roller 158. The continual rotating upper feed-rollers 88, 89 feed in each complete revolution of the main drive-shaft 72 a length of the web 84 just sufficient to form an inner wrapper of desired size when severed from the web, and the same is also done by the intermittent feed-rollers 98, 99. The bent wires 103 permit the web to buckle somewhat between the said upper and lower feed-rollers during the pauses of the latter. The swinging-cutter 174 severs a wrapper from the web 84 while the intermittent feed-rollers 98, 99 and feed-roller 158 are at a pause, with the recesses 161 of the latter in the relative positions shown in Fig. 7. Thus when the wrapper is advanced by the roller 158 and drum 128 to the position shown in Fig. 52 its rear edge registers with a recess 161.

In each complete revolution of the drive-shaft 72 the intermittingly-rotating shaft or roller 113, beneath the label magazine 107, is given a complete turn. Simultaneously therewith the label feed-rollers 118, 119 are rotated. In the rotation of the shaft 113 from, and around to, the position shown in Fig. 7, its friction-strip 117 engages the lowermost label with sufficient friction to move and tear it from the retarding pin 112, which latter, by its engagement with the next overlying label, prevents the discharge of more than one label at a time. The label as it leaves the magazine enters the bite of the rollers 118, 119, which direct it beneath, and simultaneously with the paraffined-wrapper, onto the drum 128 where both wrappers are engaged by the drum and friction feed-roller 158, in their next succeeding movement, and carried to the position shown in Fig. 52. The rear edge of the outer wrapper or label when in the position shown in Fig. 52 is in a recess 161 of the roller 158. On the instant that the wrappers reach the said position, the pusher 194 advances a gum-stick against them and forces them with the stick into the registering pocket, 130, of the drum, to effect the initial folding of the wrappers, as shown in Fig. 53. The purpose of the recesses 161 is to cause the wrappers to be released from the pressure of the roller 158 when they are engaged by the gum-stick. The gum-stick and its wrappers are held against dropping out of the pocket 130, during the rotation of the drum 128, by the clamping rollers 134.

Mounted upon a pair of parallel arms 210, 211, projecting forward from the main-frame, is a stationary table 212, a plan of which is shown in Fig. 33. The table has a concave surface 213 (see Fig. 7) in the arc of a circle drawn from the shaft 129, leaving a narrow segmental passage 214 between it and the drum 128. On the end of the table adjacent to the drum is an upwardly inclined shelf, or wrapper-folding projection, 215 which operates to engage and turn the wrappers (as illustrated in Fig. 54) in the turning of a drum-pocket 130 from the position shown in Figs. 52, 53 to the position shown in Fig. 54. In the next intermittent movement of the drum 128 the said pocket 130 with its contents are moved to the position shown in Fig. 55. Extending, through the table, from the supporting-arm 21 to the supporting-arm 211, are parallel slots 216, and also extending through the table adjacent to the supporting-arm 211 is a short intermediate longitudinally extending slot 217. In the top of the table at opposite sides of the slot 217 is a pair of shallow longitudinally extending grooves or recesses 218 (see Fig. 11). The slots 216 register with the annular grooves 131 in the drum 128. Extending over but out of contact with the table 212 is a companion wrapper-folding member or block 219 (shown in detail in Figs. 22, 23, and 24, in side elevation in Fig. 5, and in longitudinal section in Fig. 7). The block 219 is formed with a pair of parallel bifurcated arms 220 on one side and with a handle 221 at its opposite side. The arms 220 loosely embrace a bracket 222 (see Fig. 8) on the adjacent part of the main-frame, the bifurcations of the arms passing over and receiving a pin 223 passing through and projecting beyond opposite sides of the bracket 222. On the side of the block 219 adjacent to the handle 221 is a lug 224 extending to a plane slightly below the plane of the under surface of the block and resting on a lug or bracket 225 fastened against the outer edge of the table 212. In the underside of the lug 224 is a shallow socket 226 which fits over the end of a vertical screw 227. In the outer side of the lug 224 is a notch 228 (see Fig. 8) which is engaged by a swinging spring-pressed catch 229 pivoted upon the side of the bracket 225. The purpose of the construction described is to render the block 219 readily removable from and replaceable in the machine. To remove it the catch 229 is pressed down by the operator with one hand, to release it, while he grasps the handle 221 with the other hand. Slight raising of the handle lifts the block out of engagement at its socket 226 with the projecting screw 227 after which the block may be withdrawn from engagement of its bifurcated arms 220 with the pin 223. To insert the block it is passed over the table until its bifurcated arms 220 engage the pin 223, then lowered at its outer side to cause its socket 226 to engage the screw 227 and its notch 228 to be engaged by the catch 229, whereby it is held rigidly in place. In the underside of the block 219 is a pair of parallel grooves 230, and fastened against the under face of the block between the grooves is a smooth-faced plate 231. Fastened against the underside of the block at the outer sides of the grooves 230 are bars 232 having inclined end-portions 233 each terminating in a point, the outer surfaces of the inclined parts being beveled as shown at 234 in Fig. 24. At the outer edges of the bars 232 are longitudinally-extending downwardly-projecting creasing ribs 235. Also secured against the under face of the block 219, in line with the bars 232, are blocks or plates 236 having the inclined edge faces 237, approximately parallel with the edges 233, and outwardly bent wrapper-end-engaging and turning fingers 238, all as shown. Between the inclined faces 233, 237 at each side of the block are the spaces 239. Journaled in bearing-ears 240 on the upper side of the block 219 is a rock-shaft 241 to the opposite ends of which are secured strips 242 terminating in presser-feet 243. The strips 242 extend parallel with each other and are bent coincidently to the shape shown in Fig. 23. The presser-foot portions 243 are beyond the end of the block and are pressed normally downward against the upper face of the table 212 by a torsion-spring 244 (indicated by dotted lines in Fig. 23) which surrounds the shaft, being connected at one end therewith and bearing at its opposite end against a shoulder on the block.

Journaled in bearings in the main-frame is a pair of parallel shafts 245, 246, their ends at the rear side of the machine being shown in Fig. 40 and their ends at the front side of the machine being shown in Fig. 5 beneath the table 212. The shaft 245 carries a pinion 247 driven through an idle pinion 248 from the constantly rotating gear 141. On the ends of the shafts 245, 246 adjacent to the pinion 247 are cranks 249 having counter-weights 250 and joined to rotate together by a connecting-rod 251. At their forward ends the shafts 245, 246 carry cranks 252, extending at right-angles to the cranks 249, provided with counter-weights 253 and crank-pins 254 (see Figs. 1, 5 and 7).

Pivotally mounted on the parallel crank-pins 254, beneath the table 212, is a plunger-frame or transporter 255 formed with sleeves 256 (see Fig. 17), at which it is journaled on the crank pins, and a pair of parallel side-plates 257. The plates are provided with coincident successive wrapped gum-stick receiving pockets 258, 259, 260 and 261 (see Figs. 5 and 7); coincident successive fingers 262, 263, 264, and 265, and end gum-stick-lifting lugs 266 a little more than half the height of the fingers 262, 265, as indicated in Fig. 7. On the opposite sides of the table 212 are a stationary pair of shallow, upwardly projecting and longitudinally extending guides 267 (Fig. 33) presenting concave surfaces conforming to the ends of a wrapped gum-stick. On the plunger-frame and secured against the outer sides of the plates 257 are brackets 268 formed with vertical wrapper-end engaging and raising arms or plates 269. Fulcrumed in the table-slot 217 on a pin 270 is an upwardly projecting stop 271, most plainly shown in Figs. 5, 33, and 34. The stop 271 is provided at its lower end with a short arm 272, at which it is pivotally connected with the upper end of a rod 273 connected at its lower end to a long coiled spring 274 (see Fig. 1), which in turn is connected at its lower end to a bracket 275 on the main-frame. (The bracket 275 is plainly shown in Fig. 2). The stop 271 and rod 273 have straight-edge meeting-shoulders at 276, at which they are held together by the downward pull of the spring 274. Pressure exerted against the stop 271 (in the direction to the left in Figs. 5 and 34) turns it toward the horizontal plane on its pivot 270, raising the rod 273 against the resistance of the spring 274. When the pressure against the stop is released the spring returns the parts to normal position, wherein the shoulders at 276 abut.

The purpose of the table 212 and block 219 is to guide the partly wrapped sticks as they are moved intermittently along the table by the transporter 255, complete the folding of the wrappers in the intermittent movement of the sticks and assemble the wrapped sticks into stacks or bunches against the stop 271, as shown in Figs. 59 and 60. When the drum 128 comes to a pause with a gum-stick holding pocket 130 in the third position, (which is diametrically opposite the first gum-stick receiving position), the plunger-frame or transporter 255 starts to move upward and then toward the left from the positions shown in Figs. 5 and 7, causing its fingers 262 to traverse the annular grooves 131 of the drum, engage the partly wrapped stick of gum 80, as shown in Fig. 55, and move it along the table beneath the block 219 to the position indicated in Fig. 56. In approaching this position the free edge-portions of the wrappers are folded upward against the upper face of the gum-stick, and the end-portions of the wrappers are then creased, just beyond the ends of the gum-stick, by being passed along the creasing-ribs 235 carried by the block 219. In the next plunging movement of the plunger-frame the fingers 263 on rising through the table slots 216 engage and advance the gum-stick to the position indicated in Fig. 57. As the fingers 263 engage the gum-stick to advance it as described, the plate-portions 269 of the brackets 268 engage the projecting ends of the wrapper, fold them flatwise against opposite sides of the block 219 and cause the said upwardly projecting wrapper-ends to enter the guide-spaces 239 in the underside of the block between the fingers 238 and edges 233. In the next movement of the plunger-frame the gum-stick is engaged by the fingers 264 and forced along, nearly but not quite, to the position of the wrapped stick 80 shown to the right in Fig. 59. In its movement to this position the free ends of the wrappers, beyond opposite ends of the gum-stick, are acted upon by the guides 267, inner edges of the fingers 238 and then the under surfaces of the blocks 236 to overturn and fold the wrapper-ends flat against the upperside of the gum-stick. This completes the folding of the inner and outer wrappers, as indicated in Fig. 58. In the next movement of the plunger-frame the wrapped stick is engaged by the fingers 265 and moved, under the upwardly yielding pressers 243, against the stop 271. In the next movement of the plunger-frame the lifting-lug portions 266 of the side plates 257 engage the underside of the gum-stick and raise it along the stop 271 against the pressure of the presser-feet 243, so that the next following wrapped gum-stick is passed beneath it to the stop 271. The operations described are repeated until five wrapped sticks of gum are stacked, successively, one beneath the other, against the stop 271, as indicated in Fig. 60.

Fastened against the rear edge of the table 212 above its supporting arm 211 is a stationary bracket 280 (see Fig. 11) carrying a short longitudinal guide-plate 281 bent upward at its end adjacent to the pressers 243, as shown in Figs. 59 and 60. The inner face of the bracket 280 at the end adjacent to the pressers 243 is beveled, as shown at 282. Secured against the opposite edge of the table 212 in line with the bracket 280 is a downwardly extending bracket 283 (see Fig. 11) through which extends a horizontal bearing pin 284 on which a swinging bracket 285 is pivotally mounted to swing from the position shown in Fig. 11 to an outwardly inclined position against a stop projection 286 on the lower end of the bracket 283. The swinging bracket 285 carries a longitudinally extending plate 287, of the same shape as the plate 281 described and having an upwardly bent end-portion in line with that of the plate 281. Projecting outward from the swinging bracket 285 is a handle 288 carrying a spring-latch 289 adapted to engage a pin 290 on the bracket 283 to lock the bracket 285 in the closed position, shown in Fig. 11. During the operation of the machine the swinging-bracket 285 remains in its closed position, but may be swung outward to a slanting position on its pivot 284 to give access to the end-portion of the table 212.

Carried by a shaft 291 extending through and journaled in bearings in the front and rear cheeks of the main-frame, is a drum 292 (see Figs. 1, 10, 35, 36 and 38) provided in diametrically opposite sides with deep pockets 293. The drum has a central opening 294 longitudinally through it, at which it fits over the end of the shaft 291, being secured thereto, all as shown in Fig. 35. In the peripheral face of the drum 292 are four parallel series of segmental recesses 295, 296 formed as shown in Fig. 38; and bisecting the recesses 295 are inclined longitudinally extending sockets or slots 297. Extending in cylindrical openings longitudinally through the drum at the bases of the sockets 297 are rotarily adjustable cylindrical pieces 298, each having a longitudinally extending cutaway portion presenting a shoulder or stop 299. The purpose of the axially adjustable cylinders 298 is, by their adjustment, to regulate the depth of the slots 297. In the pockets 293 and extending beyond opposite ends of the drum (as shown in Fig. 36) are ejector-bars 300. One of the said bars is upon the end of a hollow post or cylinder 301, which works through a cylindrical opening 302 crossing the central opening 294 of the drum. The other ejector-bar 300 carries a central cylindrical guide-boss 303 fitting loosely into the end of the cylinder 301 and having a stem 304 passing through a guide 305 in the cylinder. On the end of the stem 304 is a head 306, and surrounding the stem and confined between the head 306 and guide 305 is a helical spring 307. The ejector frame, consisting of the bars 300 and attendant parts described, is adapted to slide radially of the drum in the guide-opening 302; the construction permitting one bar to be moved against the resistance of the return spring 307 independently of the other bar and slightly beyond the mouth of the respective pocket 293. In the drum-opening 294 is a friction disk 308, confined between the same and a plug 309 is a spring 310 which presses the disk 308 yieldingly against the post or cylinder 301 to offer a slight degree of friction against movement of the ejector frame, whereby it will be prevented from sliding of its own weight in the turning of the drum.

On the shaft 142 (see Figs. 40, 41), on the side of the bracket 74 opposite the gear 141, (see Figs. 2 and 14) is a miter-gear 312. Journaled in a standard 313 on the top of the main-frame, which carries the spool-supporting standard 86 (see Fig. 3) and a short standard 314 parallel therewith, is a shaft 315. Integral with the top of the standard 314 (see Fig. 14) is a bracket 316 projecting beyond the rear side of the main-frame. Forming, in effect, an integral part of the bracket 74 is a bracket 317 joined to the bracket 316 by an inclined tube 318 (see Fig. 3). Journaled in and passing through the tube 318 is a shaft, provided at its lower end with a miter-pinion 319, meshing with the miter-pinion 312, and carrying at its upper end beyond the bracket 316 a bevel-pinion 320 meshing with a bevel-pinion 321, upon the shaft 315 (Figs. 14 and 15) and normally held to rotate therewith by clutch-mechanism hereinafter described. On the shaft 315, adjacent to the bevel-gear 321, is a pinion 322. Meshing with the pinion 322 is an idle-gear-wheel 323, on a stub-shaft 324 (see Figs. 42, 43) held in a standard portion 325 of the rear cheek portion of the main-frame. On the inner face of the idle gear 323 are four rollers 326 equi-distant apart. Beneath the stub-shaft 324 is a stub-shaft 327 journaled in the standard 325, and carrying an idle gear 328 provided in its face with four radially extending cam-ways 329. The idle gear 328 engages a pinion 330 on the drum-carrying shaft 291, above described, and the pinion 330 engages a pinion 331 on a shaft 332. The shaft 332 is made up of jointed sections like the shaft 292 before described, to render the shaft, as a whole, flexible. Meshing with the gear 323 is an idle gear 333 on a stub-shaft 334, journaled in the standard 325, and carrying a second gear 335 engaging a pinion 336 on a cross-extending shaft 337. The bevel and miter gears described are so constructed that the shaft 315 is rotated continuously at the speed of one revolution with each five revolutions of the main drive-shaft 72, and the idle gear 323 one with each twenty revolutions of the main drive-shaft. In the comparatively slow rotation of the gear 323, its rollers 326 move into and then out of the cam-ways 329 on the gear 328, and the construction is such that while one roller 326 is leaving a cam-way and the next roller 326 is entering the next cam-way, to engage and turn the gear 328, there is a momentary pause in the rotation of the gear 328, and consequently in the rotation of the pinion 330 and pinion 331 driven thereby. In each intermittent movement of the pinion 330, it and its shaft 291 are turned half of a revolution, thereby turning the drum 292 half of a complete revolution. In practice, the drum turns half of a complete revolution and then pauses momentarily in five revolutions of the main-drive shaft 72, and when it pauses one of its pockets 293 is in horizontal line with the end of the table 212. On the end of the shaft 315, in front of the standard 313, is a crank 340 (see Figs. 10 and 51) carrying a horizontal forward extending wrist-pin 341. Loosely surrounding the wrist-pin, so that the latter may rotate therein, is a horizontal sleeve 342, integral with which is a sleeve 343 extending in a plane at a right-angle thereto. Journaled in a bearing through the upper end-portion of the standard 313 is a short shaft 344 (see Figs. 1, 3, 4, 50 and 51) provided at opposite ends with the oppositely extending crank-arms 345, 346, having laterally extending wrist-pins in their outer end-portions. Pivotally connected at its upper end to the wrist-pin of the crank 345 is a plunger-rod 347 passing through and sliding in the sleeve 343, and provided at its lower end with a pusher-head 348 having a pair of downwardly projecting prongs 349.

On the shaft 315 are three cam-disks 350, 351 and 352 (see Fig. 4) between the standards 313 and 314 described. In one face of each of the disks is a cam-groove 353, as indicated in Figs. 44 and 45. On the shaft 315 between the disks 350 and 351 is a loose nut 354 (like that shown in Fig. 47), then a separable spacer-nut 355 (like that shown in Fig. 46), and then another loose nut 354, one of the loose nuts being close to the grooved face of the disk 350, and the other close to the grooved face of the disk 351. On the shaft 315 close to the grooved face of the disk 352 is a loose nut 354 spaced from the hub of the disk 351 by a separable spacer-nut 355. Pivotally connected with the wrist-pin of the crank 346 (see Figs. 50, 51) is a connecting-rod 356 having a forked lower end 357 engaging and sliding upon the loose-nut 354 adjacent to the disk 350 and provided above its fork with a roller 358 riding in the cam-slot 353 of the disk 350. In each complete rotation of the shaft 315 the double crank-shaft 344 is rocked up-and-down to raise and lower the plunger-bar 347 and its forks 349. Also in each rotation of the shaft 315 the crank 340 swings the guide-sleeve 343 around in a circular path to swing the rod 347 back-and-forth between the end-portion of the block 219, described, and the drum 292. The forked lower end of the bar 347 forms a pusher to transfer the bunch of five wrapped gum-sticks from its position against the stop 271 through the guide, formed by the side brackets 280, 285 and their top plates 284, 287, into the positioned pocket 293 of the drum 292. In moving the bunch the ends of the prongs 349 move in the table-grooves 218 and their pressure against the bunch upsets the stop 271, against the resistance of its return spring 274, whereby the bunch slides across the stop which returns to upright position again when the bunch has passed. In the return movement of the pusher the forks 349 are raised to clear the sticks then being bunched and pass across opposite sides of the stop 271.

In the plane of the table 212, beyond the drum 292, is a discharge-table 360 secured upon a supporting-bracket 361 fastened against the left-hand side or end of the main-frame. The table 360 has shallow upwardly extending sides 362 and mounted thereon is a removable covering plate having a weighted handle 364. Above the table just beyond the drum 292 is a magazine 365 (Figs. 1 and 10) in which are stacked outer labels or binders 366 for the assembled wrapped sticks, or packages, of chewing-gum. Projecting partway across the lower end of the magazine 365 is an arm 367 mounted in a bracket 368 and carrying an inclined wrapper-penetrating and supporting pin 369 like the pin 112 before described. Extending across the lower end of the magazine 365 is a stack-supporting roller 370 having a projecting, segmental, rubber friction-face 371 (see Fig. 38). The roller 370 is fixed to the cross-shaft 337. The supporting base-frame or bracket 372 (Fig. 11) of the magazine 365 is secured upon a standard portion 373 of the main-frame through which the shaft 337 passes, as shown in Fig. 4. Mounted against the side of the base-frame 372 of the magazine is a bracket 374 (see Fig. 10) having parallel downwardly extending arms 375 supporting a short shaft 376. Pivotally mounted on opposite end-portions of the shaft 376 (see Fig. 11) are short sleeves 377 provided with upwardly projecting arms 378, and coincident short bearing arms 379 for a roller 380 (see Fig. 38)

having a longitudinally extending recess 381 in one side. Short helical springs 382 (see Figs. 10 and 11) tend to press the roller 380 against the periphery of the drum 292 in such a way that it may yield bodily or separately therefrom at opposite ends. On the arms 378 are coincident laterally extending lug-portions 383 fitted with set-screws 384 forming adjustable stops which impact against shoulders on the bracket 374 to prevent the roller 380 from being pressed by the springs 382 into the pockets 293 of the drum 292 in the rotation of the latter. Fastened against the face of the bracket 374 is a strip 385 having bent ends 386 which limit the swinging of the arms 378 against the resistance of the springs 382, and consequently the rise of the roller 380 away from the periphery of the drum 292. The roller 380 carries a pinion 387 (see Fig. 11) meshing with a gear-wheel 388 on the drum-shaft 291.

In each rotation of the shaft 337 the segmental friction face 371 of the roller 370 engages the lowermost label or binder 366, in the magazine 365, advancing it from the position shown in Fig. 39 to and beyond the position shown in Fig. 38. It will be understood that the stack rests upon the penetrating pin 369 and roller 370, the pin operating to prevent more than one binder or label from being fed at a time, the same as in the case of the labels in magazine 107 as before described. The operations of the binder-feeding roller 370, drum 292, and roller 380, are so timed with relation to each other that as a label or binder 366 is fed from the lower end of the magazine, it enters one of the segmentally disposed sockets 297 of the drum for a distance regulated by the stop 299 therein. At this time the recess 381 of the roller 380 also registers with the socket 297 to permit the free passage of the binder or label into the socket. This operation takes place while the drum 292 is at a pause in the position indicated in Fig. 38. In the next semi-rotation of the drum 292 the binder or label 366 is carried around to the position indicated in Fig. 59, its rear end-portion crossing the mouth of a pocket 293 in the drum. Thus as an assembled bunch of wrapped sticks of chewing-gum is advanced by the pusher 349 past the stop 271 and through the guide-way 280, 281, 282, and is forced into a pocket 293 by the pusher, all as before described, it presses the label 366 against the adjacent bar 300, of the ejector frame, and forces the label into the pocket to partly envelop the bunch of assembled sticks (as indicated in Fig. 62) while the bundle and bar are being forced to the base of the pocket 293. Fastened against the end of the table 212 is a parallel series of three guide-fingers 390 (see Fig. 35) of the shape shown most plainly in Fig. 10. The guide-fingers 390 are separated as indicated, leaving spaces between them registering with the segmental recesses 295, 296 in the drum 292. The segmental guide-faces of the fingers 390 extend in the arc of a circle drawn from the shaft of the drum 292, leaving a segmental space 397 between them for the binder 366, as shown in Fig. 62.

Journaled below the standard portion 373 of the main-frame in a bearing 400 on the front cheek of the main-frame (see Fig. 4) is a rock-shaft 401 carrying a crank 402 (see Figs. 48, 49). The crank 42 is pivotally connected with the lower end of a connecting-rod 403 having a forked upper end 404, and carrying a roller 405 in the cam-groove of the disk 351 on the shaft 315. The forked end 404 slides upon a loose nut 354 adjacent to the disk 351, being held against movement longitudinally of the shaft by one of the spacer-nuts 355 before described. In each rotation of the shaft 315 the shaft 401 is given a rocking motion. Fixed upon the outer-end portion of the shaft 401 is a mucilage or paste-receptacle 406, half of which, as shown in Fig. 37, is closed by a removable sliding cover 407. The other half has a permanent cover 408 containing four slots 409 (see Figs. 35 and 37). Journaled in bearing-brackets 410 on the receptacle 406 is the end section of the flexible shaft 332 shown in Figs. 42, 43, and before described. The shaft 332 carries four rotary paste-applying disks 411, which rotate in the receptatcle and through the slots 409. In the rocking of the shaft 401 the paste-receptacle is swung up and down in an arc of which the shaft 401 is the center; and in the rotation of the shaft 332 the disks 411 are turned intermittingly.

In operation, when the drum 292 comes to a pause in the position shown in Figs. 61 and 62, and the pusher 349 is advancing the assembled bunch of wrapped gum-sticks toward the pocket 293, and while the forward edge portion of the label or binder 366 is still in the slot or socket 297, the paste receptacle rocks upward to raise the paste-disks 411 against the end portion of the label or binder, pressing the same gently against the flat surfaces formed by the bases of the peripheral recesses 295 in the drum, and applying the paste to the binder a short distance from the end thereof. In this operation four short streaks of paste are applied to the label or binder. The paste-disks then recede, and the pushers 349 force the bunch and binder into the pocket 293. In the next movement or half turn of the drum 292 the free portion of the binder or wrapper 36 moves down the inclined surface 412 formed by the inclined ends of the guide-fingers 390 (see Figs. 62 and 10). As the pocket 293 nears the position shown in Fig.

63, the wrapper or binder 366 is engaged by the end of the table 360, and turned down as shown.

Passing through the main-frame below, and a little to one side and parallel with the shaft 332, is a rock-shaft 415 (see Figs. 10 and 11) carrying a crank 416 pivotally connected with the lower end of a connecting-rod 417, having a forked upper end 418 (see Figs. 44 and 45). The forked end of the connecting rod slides upon one of the loose nuts 354 on the shaft 315 and the connecting rod carries a laterally extending roller 419 entering the cam-groove 353 of the disk 352. The connecting-rod and nut 354 are held to the face of the disk 352 by one of the spacer-nuts 355. At its outer or forward end beyond the forward cheek of the main-frame the shaft 415 carries a crank having an arm 420 parallel with the shaft 415. At the opposite ends of the arm 420 is a pair of inclined upwardly extending package-discharging fingers 421 beyond opposite ends of the drum 292 and bars 300, and having inwardly-extending bar-engaging projections or shoulders 422 (see Figs. 45 and 64). When the respective bar 300 is in its retracted position in the pocket 293 and is moved with the drum toward the position shown in Fig. 63, it passes at its opposite ends between the discharge fingers 421 and upward in front of the shoulders 422. At the moment the drum is turned into, and stops with its pocket 293 in, the position shown in Fig. 63, the shaft 415 is rocked by the cam-disk 352 to swing the crank-arm 420 in the arc of a circle, of which the shaft 415 is the center. Thus the fingers 421 are swung from their retracted position (wherein their ends are close to the center of rotation of the drum 292) to the advanced position indicated in Figs. 1 and 64. In this movement the shoulder portions 422 of the fingers 421 engage the bar 300 and slide it to the periphery of the drum, and then slightly beyond against the resistance of the return spring 307, thereby ejecting the wrapped bunch of gum-sticks from the pocket 293. In moving out of the pocket onto the table 360 the package passes under against the cover 363, which tends to press it down against the table 360. In the movement of the package or bundle of gum-sticks from the position shown in Fig. 63 to its next position shown in Fig. 64, the edge of the table 360 engages the free end portion of the label or wrapper 366, causing it to be turned upward by the movement of the package and pressed at its paste-carrying edge-portion against the opposite edge portion of the binder to secure the ends together, whereby the bunch of gum-sticks is securely bound by the surrounding outer wrapper or binder 366, as shown in Figs. 64 and 65. As package after package is delivered onto the table 360 they are forced along, under slight pressure of the cover 363, to give a little time for the paste to dry.

For convenience a hand-wheel 423 is provided on the drive-shaft 72, and a handle-wheel 424 is provided on the end of the wrist-pin of the crank 340, centered with the shaft 315, to permit the shafts to be turned by hand when desired for any reason.

The rotation of the shaft 315 which operates the swinging pusher-rod 347, and from which the drum, binder-feeding and pasting mechanism and the discharger are given, rotates as one to five with relation to the drive-shaft 72 from which the gears and attendant parts, shown in Fig. 40, are more directly driven. For purposes of safety it is desirable, in the event that any of the mechanisms driven from the shaft 315 become clogged, that to avoid strain on the parts the machine be automatically stopped. To accomplish this the bevel-gear 321 is loose upon the shaft 315. Pivotally mounted upon the said shaft at the side of the gear 321 is a segmental, swinging clutch-member 430 (see Figs. 14, 15, and 16) having a beveled stud 431 on its face, adapted to enter a socket 432 in the face of the gear 321, and clutch the latter to the shaft 315. On the adjacent end of the shaft 315 is a disk 433 having an opening through it for a longitudinally movable pin 434, which engages a socket 435 in the swinging clutch-member 430 (as shown in Fig. 15). Surrounding the rod 434, and confined between a stop 436 thereon and the disk 433, is a spring 437 which tends normally to press the clutch-member 430 at its stud 431 into engagement with the socket 432 in the gear 321. Fulcrumed between its ends on the end of the bracket 316 (see Fig. 14) is a lever 438 having a disk-shaped head 439 in the path of longitudinal movement of the rod 434. Fulcrumed upon the bracket 317 (Fig. 14) is a lever 440 in the path at its short arm of the end of the lever 438. The long arm of the lever 440 engages the groove 80 of the sliding clutch-member 76 on the clutch-shipping rod 77, which, as before stated, passes longitudinally through the drive-shaft 72. Should any of the mechanism driven from the shaft 315 be clogged and offer too great resistance, the clutch-stud 431 will be forced out of the socket 432, swinging the clutch-member 430 outwardly on its pivot against the resistance of the spring 437, and moving the rod 434 against the disk 439. This longitudinal movement of the rod 434 swings the lever 438, causing it in turn to swing the lever 440 and move the sliding clutch-member 76 to produce disengagement between the shaft 72 and the driving pulley 75, thus stopping the machine.

In practice, one operator standing at the front and right-hand end of the machine watches its operation, keeps the magazine 81 supplied with sticks 80 of chewing-gum, or like articles to be wrapped, the magazine 107 supplied with outer stick-wrappers or labels 108, the magazine 365 supplied with package labels or binders 366, and at long intervals stops the machine to renew the roll of paraffined paper, for the inner stick-wrappers, on the spool 85. While the main drive-shaft turns at comparatively high speed, the rotary carrier or drum 128 turns intermittingly at one-quarter the speed of the drive-shaft, and in each quarter revolution it pauses while one of its article receiving and wrapper folding slots or pockets 130 registers with the pusher 194. The rotary bunch-carrier or drum 292 turns at a speed approximating one-fifth that of the drive-shaft with a momentary pause at the end of each half revolution, while one of its bunch receiving pockets 293 registers with the end of the table 212, and its other pocket registers with the discharge-table 360. The inner paraffined-wrapper intermittent-feeding, severing and positioning mechanisms, the outer stick-wrapper or label feeding and positioning mechanism, the pusher 194, and the plunger transporter 255, all coöperate in their movements with the intermittent turning movements of the drum 128; while the intermittent feeding and positioning mechanisms of the package-binders or labels 366, the plunger pusher 348, rocking paste-applying mechanism, and package-discharging fingers 421 all coöperate in their movements with the intermittent turning movements of the drum 292. In each rotation of the main drive-shaft a stick of gum is slid from the lower end of the magazine 81 into a registering drum-slot or pocket 130, forcing with it into the pocket the inner and outer gum-stick wrappers, whereby the latter are folded, as shown in Fig. 53; in the next intermittent turning movement of the drum 128 the wrappers are turned to the position shown in Fig. 54; and in the third intermittent movement of the drum the gum-stick and its wrappers are carried to the position shown in Fig. 55 into register with the top of the table 212. During the next following rotations of the drive shaft 72 and successive intermittent movements of the drum 128, the stick and its wrappers are moved by the plunger-frame or transporter 255 first to the position shown in Fig. 56, to complete the folding of the wrappers about the stick, then to the position shown in Fig. 57, during which movement the projecting ends of the folded wrappers are creased and turned up, then to a position approaching that shown in Fig. 59, during which movement the wrapper ends are turned inwardly upon the stick, as shown in Fig. 58; and in the next intermittent movement of the drum the wrapped stick is moved to the stop 271. In the four following plunging movements of the transporter 255 the wrapped gum-sticks are lifted along the stop 271, while a wrapped gum-stick is passed beneath them to the stop, to form a stack of five assembled wrapped gum-sticks, as shown in Fig. 60. Following the last stated plunging movement of the transporter 255 the pusher-fingers 349 force the stack or bunch of assembled wrapped gum-sticks past the upsetting stop 271 through the guide beneath the plates 281 and into the then registering pocket 293 of the drum 292, forcing the adjacent sliding plate 300 to the base of the pocket.

During the movement of the drum 292 to carry one of its pockets 293 into receiving position, a package wrapper or binder 366 is fed and carried around to extend over the mouth of the pocket, as shown in Fig. 59, and as a bunch of wrapped gum-sticks is forced into the pocket by the pusher-fingers 349, the binder is folded partly around the bunch, as indicated in Fig. 62. While the drum 292 is turning from the position shown in Fig. 59 to that shown in Fig. 62, the paste-receptacle 406 is rocked upward to cause the pasting-disks 411 to contact with and then release the edge portion of the binder. In the following intermittent movement of the drum 292, its filled pocket 293 is carried around to the position shown in Fig. 63, turning the binder to the position there shown. During the pause of the pocket in this position, the discharging fingers 421 engage opposite ends of the sliding plate 300, forcing it to the position shown in Fig. 64 to eject the package of wrapped gum-sticks from the pocket 293, and slide it on to the table 360 beneath the covering plate 363. In this movement the pasted edge portion of the binder is folded upward against the package, thus completing the operation. The packages are advanced intermittingly along the table 360, under the clamping pressure of the cover-plate 363 to give time for the paste to set, the advance of the packages being produced by the one forced onto the table by the discharge fingers 421.

The article-holding magazine 81, having the inclined lower-end portion, 200, in combination with the article-engaging and releasing positioner formed by the bent rods or wires 205, constitute a peculiarly effective construction for insuring the proper positioning of the lowermost article 80 with reference to the pusher 194, and the quick and accurate delivery of the article by the pusher into the registering pocket 130 of the intermittently rotating carrier 128. The clamps, or clamping rollers 134, insure the retention of the partially wrapped article in the pocket 130 while the rotating carrier moves the pocket to the second and third positions.

The steadily rotating web-feeding rollers 88, 89, draw the paraffined paper steadily, without jerk, from the spool 85, while the intermittent web-feeding rollers 98, 99, are timed with the movements of the swinging web-severing cutter-blade wrapper-feeding roller 160 and drum or carrier 128, and take-up the slack of the web between the guides 102, 103, in each feeding movement. At the moment that the article 80 contacts with the wrappers to force them into the pocket 130, the roller 160 is turned to the position wherein a recess 161 therein registers with the peripheral face of the carrier to release the ends of the wrappers and permit them to be moved freely by the articles to receive the first folds. The ready adjustability of the hinged frame 110, permits the feeding mechanism for the outer article-wrappers or labels 108 to be quickly adjusted with relation to the feed mechanism for the inner-wrappers 84, and the drum or carrier 128, insuring accurate and timely placing of the labels in position upon the carrier. The annular grooves 131 in the drum or carrier 128 permit the fingers 262 of the plunging transporter 255 to pass upward behind the article in the pocket to engage and slide it out of the pocket into the stationary guide-way, between the table 212 and its covering-block 219, in which movement the last article-surrounding fold of the wrappers is produced. The table 212 and block 219 with their stationary wrapper-creasers and deflectors in combination with the plunging transporter operating, as described, to advance the article intermittingly, fold the wrapper-ends and then stack or bunch the wrapped articles, form a simple positively-acting mechanism for coöperation with the rotating drum or carrier 128 and its attendant features, thereby permitting the machine to be operated at a very high speed and without danger of any mishap under normal conditions that would render stopping of the machine necessary.

The pockets 130 in the drum 128 are non-radial and their bases are relatively close to the peripheral surface of the drum, so that only a slight rise of the plunging transporter is required to cause the fingers 262 to engage the articles 80 (as shown in Fig. 55). Were the pockets radial, their bases would be much farther from the periphery of the drum and a much greater plunging movement of the transporter would be necessary to engage and move the articles out of the pockets. The centrifugal action in the rotation of the drum furthermore tends to keep the articles in the pockets rather than throw them out.

While the article-wrapping and assembling features form in themselves a highly perfected and compact mechanism, the mechanism for forming a predetermined number of the wrapped articles into a package by surrounding the same with a binder or label 366 having its overlapping edges pasted together, is, for controlling commercial reasons, a highly desirable adjunct to the other mechanism, and, in the present instance, is especially devised to coöperate with said other mechanism in the same machine, and under coincidently timed movements, to produce from the materials fed into the machine the completed commercial article, or package, shown in Fig. 65, by a continuous operation.

The foregoing description is intended to convey a clear understanding of my improvements in what I now believe to be the best form of their embodiment, and no undue limitation should be understood therefrom. It is my intention to claim all that is novel in my invention, and that the claims shall be construed as broadly as the prior state of the art may warrant.

What I claim as new and desire to secure by Letters Patent is—

1. In an article-wrapping machine, the combination with the wrapper-applying mechanism, of a magazine, in which the articles to be wrapped are stacked and down which they gravitate, having a guide-surface in its lower-end portion inclined toward the wrapper-applying mechanism, article-engaging and releasing presser-mechanism for causing the lower articles of the stack to conform to said guide-surface, a support for the stack, pusher mechanism operating intermittently to discharge the lowermost article from the stack, and means for retracting the said presser-mechanism intermediate the article-discharging operations of said pusher mechanism.

2. In an article-wrapping machine, the combination with the wrapper-applying mechanism, of a magazine, in which the articles to be wrapped are stacked and down which they gravitate, having a guide-surface in its lower-end portion inclined toward the wrapper-applying mechanism, article-engaging and releasing presser-mechanism for causing the lower articles of the stack to conform to said guide-surface, a support for the stack, and a reciprocating pusher, for discharging the lowermost articles successively from the stack, in its backward movement operatively engaging and retracting said presser-mechanism.

3. In an article-wrapping machine, the combination of a movable carrier, having an article and wrapper holding-pocket, means for forcing the article with the wrapper into said pocket, a wrapper-holding magazine, wrapper-feeding means between said magazine and carrier operating intermittingly to transfer a wrapper from the magazine toward the carrier, and means for varying the distance between said wrapper-holding magazine and carrier to regulate the positioning of the wrapper with reference to the said pocket.

4. In an article wrapping machine, the combination with the main-frame, of a carrier thereon having an article and wrapper holding-pocket, means for forcing an article with the wrapper into said pocket, a support on the main-frame, a wrapper-holding magazine on said support, wrapper-feeding means between the magazine and carrier operating to transfer a wrapper from the magazine to the carrier, said support being adjustable with reference to the carrier to regulate the positioning of the wrapper on the carrier with reference to said pocket.

5. In an article-wrapping machine, the combination of a rotary drum having a circumferential recess and a non-radial article and wrapper holding-pocket crossing said recess, means for forcing the article and a wrapper, of greater length than the article, into said pocket to partly fold the wrapper around the article, a stationary guide-way having wrapper-end-overturning deflectors, and a plunging transporter movable in said recess to engage and move the article and its wrapper from said pocket into and through said guide-way to complete the folding of the wrapper around the article, and overturn the wrapper-ends.

6. In an article-wrapping machine, the combination with means for so folding the wrapper around the article as to leave projecting wrapper-ends, of a stationary, slotted table, a cover for the table forming therewith a guide-way, wrapper-end-folding deflectors in the guide-way, and a transporter having wrapper-end-bending projections for turning the wrapper ends into engagement with the deflectors and a projection movable in the slot of the table to engage and advance the article through the guide-way along said deflectors.

7. In an article-wrapping machine, the combination with means for so folding the wrapper around the article as to leave projecting wrapper-ends, of a stationary, slotted table, a cover for the table forming therewith a guide-way, wrapper-end-folding deflectors in the guide-way, a stop and a resilient presser beyond said cover, and a plunging transporter having projections movable in the slot of the table to engage and advance the article through the guideway along the said deflectors and under the presser to the stop and lift the articles along the stop so that they are assembled, by the depositing of one beneath another, into a bunch.

8. In an article-wrapping and package-forming machine, the combination of a normally upright upsetting-stop, means for bunching a predetermined number of the wrapped articles against the stop, a movable carrier having a bunch-receiving pocket, means for forcing the bunch across the stop into said pocket, means for feeding a binder over the mouth of said pocket across the path of the bunch to be forced into the pocket by the bunch and thereby folded upon three sides thereof, paste-applying mechanism for the binder coöperating with the carrier in the movements thereof, and means for discharging the bunch from said pocket and for completing the folding and fastening of the binder about the bunch.

9. In an article-wrapping and package-forming machine, the combination of an intermittently rotating carrier having an article-receiving pocket, means for forcing an article into said pocket, means for feeding a wrapper over said pocket across the path of the article to be forced therewith into the pocket and folded against opposite sides of the article, a stationary guide-way, mechanism operating to move the article with its wrapper from said pocket into said guideway, thereby completing the folding of the wrapper around the article, and to move it along the guide-way, wrapper-end-folding deflectors in the guide-way in the path of movement of the wrapper-ends, bunching mechanism for the wrapped articles beyond the guide-way, an intermittently rotating bunch carrier having a bunch-receiving pocket, means for forcing a bunch when formed into said bunch-receiving pocket, means for feeding a binder to the bunch carrier over said bunch-receiving pocket, across the path of said bunch to be forced therewith into the pocket and to be folded thereon, paste-applying mechanism contacting with the binder on the bunch carrier, a package squeezing guide-way, and mechanism operating to discharge the bunch and binder from the bunch carrier into the package squeezing guide-way to complete the folding and fastening of the binder about the bunch.

10. In an article-wrapping machine, the combination with a drive-shaft rotating at relatively high speed, a driver therefor, a clutch between said shaft and its driver, individual-article wrapping-mechanism and mechanism for assembling a predetermined number of the wrapped articles into a bunch, all actuated at high speed from the drive-shaft, mechanism for applying binders to the bunches actuated at relatively slow speed from the drive-shaft through speed-reducing gears, a safety clutch interposed in said speed-reducing gears, serving to disconnect the same in the event of undue resistance to said slow-speed mechanism, and means causing said safety-clutch in its unclutching movement to effect like movement of the clutch between said driver and drive-shaft, to stop the latter, for the purpose set forth.

11. In an article-wrapping machine, mechanism for assembling the articles into packages and applying binders thereto, having an intermittently rotated drum provided with a bunch-receiving pocket, means for depositing a bunch of the articles in said pocket, means for feeding a binder over the mouth of said pocket, across the path of the bunch, to be forced into the pocket by the bunch and thereby folded partway around the bunch, the drum having a socket in its periphery to receive the binder at its forward edge, and means for varying the depth of said socket to regulate the positioning of the binder with reference to the pocket.

12. In an article-wrapping machine, mechanism for assembling the articles into packages and applying binders thereto, including a rotary drum provided with a bunch-receiving pocket, an ejector-bar in the pocket provided with a retracting spring, means for moving said bar radially of the drum and beyond the circumference thereof against the resistance of said spring to eject the package, the spring operating to retract the bar into the pocket when released by said moving means.

13. In a wrapping machine, the combination of means for feeding articles to be wrapped, means for winding a wrapper about each article, a stationary folding table, a folding block over the table separated from the table to leave a folding passageway, folding extensions on said block, means for shifting the wound articles through said passageway to effect coöperation of the wrapper ends with said folding projections whereby said ends are folded, supporting brackets on said folding block extending from one side of said folding block, a bar for receiving said brackets, and latch mechanism for detachably securing the other side of the block, opening of said latch mechanism allowing withdrawal of the block from the machine.

14. In a wrapping machine, the combination of means for feeding articles to be wrapped, means for winding a wrapper about each article, a stationary folding table, a folding block over the table separated from the table to leave a folding passageway, folding extensions on said block, means for shifting the wound articles through said passageway to effect coöperation of the wrapper ends with said folding projections whereby said ends are folded, bifurcated supporting brackets on said folding block extending from one side of said folding block, a bar for receiving said brackets, and latch mechanism for detachably securing the other side of the block, opening of said latch mechanism allowing withdrawal of the block from the machine.

15. In a wrapping machine, the combination of a magazine for articles to be wrapped, wrapping mechanism, feed mechanism for feeding articles one at a time to said wrapping mechanism, and means for effecting relative lateral shifting of the articles at the bottom of the magazine just prior to the operation of the feed mechanism whereby the articles are prevented from sticking together.

16. In a gum wrapping machine, the combination of a vertical magazine for receiving a stack of gum sticks, wrapping mechanism below said magazine, feed mechanism for feeding the gum sticks one at a time to said wrapping mechanism, and means for effecting relative lateral shift of a plurality of gum sticks at the bottom of the stack just prior to the coöperation of the feed mechanism with the lowermost stick whereby to prevent the sticks from adhering to each other during the feeding operation.

17. In a gum wrapping machine, the combination of a vertical magazine for receiving a stack of gum sticks, wrapping mechanism below said magazine, feed mechanism for feeding the gum sticks one at a time to said wrapping mechanism, and means controlled by said feed mechanism for effecting relative lateral shift of a plurality of gum sticks at the bottom of the stack just prior to the coöperation of the feed mechanism with the lowermost stick whereby to prevent the sticks from adhering to each other during the feeding operation.

18. In a gum wrapping machine, the combination of a vertical magazine for receiving a stack of gum sticks, wrapping mechanism below said magazine, feed mechanism for feeding the gum sticks one at a time to said wrapping mechanism, and means for laterally shifting the lowermost stick relative to the next stick above just prior to coöperation of the feed mechanism with said lowermost stick whereby any adhesion between said sticks will be destroyed just prior to the feeding operation.

19. In a gum wrapping machine, the combination of a vertical magazine for receiving a stack of gum sticks, wrapping mechanism below said magazine, feed mechanism for feeding the gum sticks one at a time to said wrapping mechanism, a spring actuated frame engaging with the rear ends of a plurality of the lowermost sticks in the magazine just prior to coöperation of the feed mechanism with the lowermost stick to thereby effect relative lateral shifting of such sticks whereby any adhesion between said sticks will be destroyed just prior to the feeding operation, and means whereby said spring frame is released upon retraction of the feed mechanism to allow downward movement of the stack and the magazine to carry the next stick into the path of the feed mechanism.

20. In a gum wrapping machine, the combination of a vertical magazine for receiving a stack of gum sticks, wrapping mechanism below said magazine, feed mechanism for feeding the gum sticks one at a time to said wrapping mechanism, a frame spring pressed toward the rear ends of a plurality of the lowermost sticks in said magazine, and means controlled by the feed mechanism to withdraw said frame upon retraction of the feed mechanism and to allow said frame to impinge against said sticks to effect relative lateral shift thereof just prior to coöperation of the feed mechanism with the lowermost stick to thus destroy the adhesion between said sticks and to allow the lowermost stick to be fed to the wrapping mechanism without resistance.

21. In an article wrapping machine, the combination of means for individually wrapping articles, a table for receiving wrapped articles, a transporting member and means for effecting combined upward and forward movement thereof, a stop at the end of said table, projections on said transporting member for successively engaging the wrapped articles on said table and for successively shifting said articles toward said stop, a lifting projection on said transporting member for raising articles at said stop in advance of the articles shifted toward said stop by said first mentioned projections whereby said articles are eventually arranged in a stack at said stop, means operative after a certain number of articles have been arranged in a stack for withdrawing the stop from the stack, and means for successively removing stacks from the table.

22. In a wrapping machine, the combination of a supporting table, an abutment member, spring means tending to normally hold the abutment member above the table surface but yielding to allow deflection of the abutment member below the table surface upon exertion of pressure against the member, means for shifting articles along the table for stacking a predetermined number thereof against said abutment member, a receiving member for the stacks, and means for engaging with the stacks and for forcing them along the table over the yielding abutment member and into the receiving member.

23. In an article wrapping machine, the combination of a frame for containing articles to be wrapped, a rotary carrier having a pocket adapted to be brought into register with said frame to receive an article therefrom, wrapper feeding mechanism, said carrier having a slot for receiving one end of a wrapper whereby upon rotation of said carrier the received wrapper will be drawn into position between said frame and pocket, means for shifting an article from said frame and against said wrapper and into the pocket whereby said wrapper is partly folded about the article, and means for varying the depth of said slot to thereby regulate the position of the wrapper with reference to the pocket.

24. In an article wrapping machine, the combination of a frame for containing articles to be wrapped, a rotary carrier having a pocket adapted to be brought into register with said frame to receive an article therefrom, wrapper feeding mechanism, said carrier having a slot for receiving one end of a wrapper whereby upon rotation of said carrier the received wrapper will be drawn into position between said frame and pocket, means for shifting an article from said frame and against said wrapper and into the pocket whereby said wrapper is partly folded about the article, a member on said carrier having a shoulder forming the bottom of said slot, said member being adjustable to shift the shoulder to thereby vary the depth of said slot to thus regulate the position of the wrapper with reference to the pocket.

25. In an article wrapping machine, the combination of a frame having a passageway for articles, a transporter member and means for causing bodily revolution of said member through an orbit at a uniform rate of speed, said passageway being included in said orbit and said member having projections for engaging in said passageway to propel articles therethrough.

26. In an article wrapping machine, the combination of a guide-way, parallel crank arms, a transporter member mounted on said crank arms to be bodily revolved thereby at a uniform rate of speed, said transporter coöperating with said guide-way to shift articles therethrough.

27. In a wrapping machine, the combination of a guide-way, two parallel shafts having crank arms at their ends adjacent said guide-way, a frame mounted on said crank arms to be bodily revolved through an orbit at a uniform rate of speed, said frame having projections for engaging in said guideway to propel articles therethrough.

28. In an article wrapping machine, the combination of a guide frame having a passageway, two parallel shafts having crank arms adjacent said frame, a transporter member mounted on said crank arms to be bodily revolved through an orbit, means for driving said shafts, said transporter having projections for traveling through said passageway to transport articles therethrough, and counter weights for counteracting the weight of said crank arms and transporter member.

29. In an article wrapping machine, the combination with folding mechanism for receiving partially wrapped articles, and a transporting member revolving through an orbit at a uniform rate of speed and coöperating with said folding mechanism to complete the wrapping of the articles.

30. In an article wrapping machine, the combination of means for winding a wrapper about articles, a frame having a passageway for receiving the articles with the wrappers and having end folding mechanism, a transporter member revolving through an orbit at a uniform rate of speed and operating to shift the articles successively through said passageway, and folding mechanism on said transporter for coöperating with the folding mechanism on said frame to effect folding of the wrapper ends during such transporting thereof through said passageway.

31. In an article wrapping machine, the combination of wrapping means for applying wrappers about articles, a frame having a passageway, a transporter revolving at a uniform rate of speed through an orbit including said passageway and having projections for shifting the articles one by one from said wrapping mechanism successively through said passageway, and coöperating folding mechanisms on said frame and transporter for folding the ends of the wrappers during traveling of the articles through said passageway.

ALBERT M. PRICE.

In presence of—
  I. D. STEELE,
  A. J. FLOYD.